(12) United States Patent
Sewell et al.

(10) Patent No.: US 9,324,090 B2
(45) Date of Patent: Apr. 26, 2016

(54) METHOD, SYSTEM AND APPARATUS FOR REINFORCING DESIRABLE CONSUMER BEHAVIORS WITH SURPRISE REWARDS

(71) Applicants: Jeffery Douglas Sewell, Austin, TX (US); Joel Lawrence Bush, Austin, TX (US); Omar Besim Hakim, Austin, TX (US)

(72) Inventors: Jeffery Douglas Sewell, Austin, TX (US); Joel Lawrence Bush, Austin, TX (US); Omar Besim Hakim, Austin, TX (US)

(73) Assignee: Copernica, Inc., Austin, TX (US)

( * ) Notice: Subject to any disclaimer, the term of this patent is extended or adjusted under 35 U.S.C. 154(b) by 0 days.

(21) Appl. No.: 14/606,521

(22) Filed: Jan. 27, 2015

(65) Prior Publication Data

US 2015/0142547 A1    May 21, 2015

Related U.S. Application Data

(60) Provisional application No. 61/932,578, filed on Jan. 28, 2014, provisional application No. 61/979,323, filed on Apr. 14, 2014.

(51) Int. Cl.
*G06Q 30/02*    (2012.01)
(52) U.S. Cl.
CPC .................. *G06Q 30/0222* (2013.01)
(58) Field of Classification Search
CPC ....................................... G06Q 30/00
See application file for complete search history.

(56) References Cited

U.S. PATENT DOCUMENTS

| | | | |
|---|---|---|---|
| 6,571,216 B1 * | 5/2003 | Garg et al. ................. | 705/14.25 |
| 7,624,038 B1 | 11/2009 | Wood et al. | |
| 2005/0153267 A1 | 7/2005 | Goldman et al. | |
| 2006/0242018 A1 * | 10/2006 | Shulman et al. ................. | 705/14 |
| 2007/0192215 A1 * | 8/2007 | Taylor et al. .................... | 705/28 |
| 2011/0029362 A1 | 2/2011 | Roeding et al. | |
| 2012/0179556 A1 * | 7/2012 | Ertas .................. | G06Q 30/0601 705/14.73 |
| 2013/0144695 A1 * | 6/2013 | Nanavati et al. ............. | 705/14.4 |
| 2013/0311260 A1 * | 11/2013 | Stoll .................. | G06Q 30/0214 705/14.16 |
| 2014/0081727 A1 | 3/2014 | Hoffmire et al. | |

OTHER PUBLICATIONS

Don't Shoot the Dog!: The New Art of Teaching and Training by Karen Prior : Publisher: Ringpress Books; 3rd edition (Nov. 1, 2006), ISBN-13: 978-1860542381, pp. 1-81.

* cited by examiner

*Primary Examiner* — Eric Netzloff
(74) *Attorney, Agent, or Firm* — Stephen A. Mason; Meyertons, Hood, Kivlin, Kowert & Goetzel, P.C.

(57) ABSTRACT

In some embodiments, a fulfillment entity receives over an electronic interface from a merchant website associated with a third-party online user community an order from a member of the user community for an item from the merchant website. During order processing, a set of rules for rewarding members of the third-party online user community based on the past behaviors of one or more members of the user community is evaluated. Responsive to a condition fulfilling one of the rules, the member order is modified to provide an incentivizing reward to the member of the online user community.

20 Claims, 18 Drawing Sheets

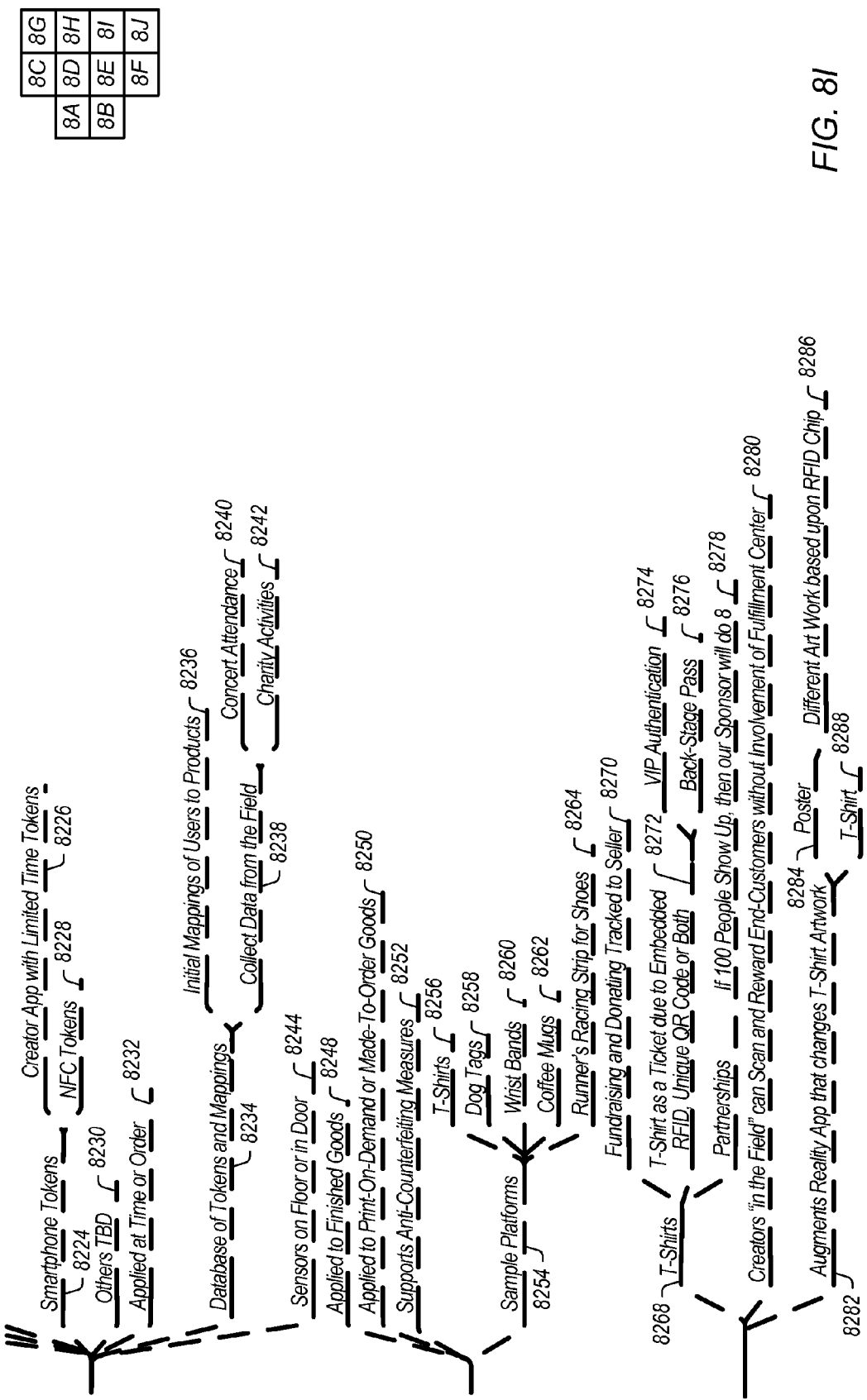

METHOD, SYSTEM AND APPARATUS FOR REINFORCING DESIRABLE CONSUMER BEHAVIORS WITH SURPRISE REWARDS

CLAIM OF PRIORITY TO PROVISIONAL APPLICATION

This application claims benefit of priority of U.S. Provisional Application Ser. No. 61/932,578 entitled "Method, System and Apparatus for Rewarding and Reinforcing Desirable Customer Behaviors" filed Jan. 28, 2014, the content of which is incorporated by reference herein in its entirety and for all purposes.

This application further claims benefit of priority of U.S. Provisional Application Ser. No. 61/979,323 entitled "Method, System and Apparatus for Rewarding and Reinforcing Desirable Customer Behaviors" filed Apr. 14, 2014.

BACKGROUND

Description of the Related Art

Electronic commerce, colloquially known as e-commerce or e-business, includes the buying and selling of products or services over electronic systems such as the Internet and other computer networks. The amount of trade conducted electronically has grown rapidly with widespread Internet usage and has further increased with the proliferation of mobile computing devices capable of accessing the Internet. Such mobile computing devices include laptop computers, tablet computers, wearable computers and smartphones. Expansion of the capabilities of such mobile devices has increased opportunities for electronic commerce by shortening the cycle of purchase, fulfillment, and delivery of goods and services.

While a significant percentage of the growth in e-commerce in recent years has involved virtual goods and services, most electronic commerce still involves fulfillment of an order that involves the transportation of physical items in some way. In the majority of e-commerce transactions, the purchase transaction is ordered or agreed electronically and interactively in real-time and subsequently completed with the delivery of one or more physical packages containing goods.

Fulfillment, also known as order fulfillment or product fulfillment, is a process whereby a person or company fulfills an obligation to send a person an item or product the person has ordered, purchased, or requested from the seller. Fulfillment typically refers to services provided by a company that offers to store, receive the orders, package, and ship ordered items on behalf of the seller to the seller's end consumers, thus acting as a critical and necessary intermediary in completing the transaction between seller and buyer. A fulfillment company may be interchangeably referred to herein as a fulfillment entity. A user may interchangeably referred to herein as a user, customer, end user, a member of a $3^{rd}$ party online community or a buyer. Thus, where the phrase "member of a community" or similar or member of a $3^{rd}$ party online community is used herein, the term may mean any buyer without regard to the buyer's actual community membership or lack thereof. A seller may be interchangeably referred to herein as a seller, merchant, or owner of a $3^{rd}$ party online community.

Typically, a fulfillment company stores items until an order for the item comes in. In some cases, storage facilities can be prepared for perishable items requiring refrigeration, temperature sensitive items requiring air conditioning or heating (such as certain types of chemicals that can break down due to extreme heat or cold), or typical warehousing protection from the elements. A fulfillment company may also store seller items that needs some additional work by the fulfillment company or its partners to complete or personalize an item before it can be fulfilled. Examples of this include, but are not limited to, printing the buyer's name or photograph on an item, packaging an item in specialized packaging, including gift notes or gift wrapping the purchased item, etc.

Fulfillment companies often charge a storage fee based on the product storage requirements, and any required special handling. The fulfillment company typically maintains and publishes inventory counts as it ships goods. Reporting systems vary by company, and range from simple spreadsheets to custom software or third-party Commercial Off-The-Shelf (or COTS) software management systems. Fulfillment companies also develop custom or implement third-party e-commerce systems to help manage the many elements within their business. The e-commerce system is adaptable and is able to integrate into the seller's ordering system—or even host the seller's ordering system themselves. They also enable integration into their respective courier's tracking systems that enables the seller's to access live information about their end customer's package deliveries "Pick-pack-and-ship" is the process of selecting items currently being stored by the fulfillment company to prepare for shipping. Companies have employees known as "pickers" that receive an order manifest. These "pickers" then travel through the warehouse to the location of the individual items, and pull them from the warehouse shelves to prep for shipping. After the "picker" takes the items in the order manifest back to the packing station, another employee—a packer—ensures that all items in the order are present, and packs and addresses them for shipping, typically including a packaging slip. The packaging slip can be a standardized slip produced by the reporting system, or its contents can be a highly customized and be unique to the seller, the seller's customer, the contents of the customer's order or based upon rules defined by the seller.

In most cases, fulfillment companies outsource shipping to courier or delivery companies. Often fulfillment companies—because of their large shipping volume—can negotiate larger shipping discounts with major delivery companies (e.g. DHL, FedEx, UPS, USPS, etc.) than sellers can by themselves. Fulfillment companies can also arrange for alternative delivery means for their orders, including local customer pickup, local couriers, delivery to intermediate storage locations (or "drop-boxes"), alternative delivery technologies like drones and pneumatic tubes, social ride sharing services and applications (e.g. Uber, Lyft, etc.) and alternative service delivery networks (e.g. pizza delivery services, flower delivery services, court order and subpoena delivery services, etc.).

Another option for fulfillment companies is to arrange for the ordered product to be created at a remote location near the end customer, utilizing remote "print-on-demand" technologies like 3D printing, t-shirt printing, poster printing, book print and binding, etc.

For sellers, outsourcing order fulfillment has many advantages. Firstly, order fulfillment is rarely the primary function of any business. By outsourcing this secondary function, time is better spent on the primary functions of the business, such as sales, marketing, production, and innovation.

There are also financial advantages for sellers to outsource fulfillment services to fulfillment companies. The costs of setting up a warehouse, staffing, managing, securing, and developing the supporting technology solutions can be very expensive. Outsourcing reduces the need for this investment. Economies of scale can also be achieved with couriers, since fulfillment companies will likely be able to achieve lower rates with couriers than any one seller can on its own. Fulfillment companies also typically have thousands of square feet of warehouse space. A fulfillment company distributes these expenses across multiple clients. This usually results in a storage fee that is less than the sellers would pay to do it themselves. Storage fees pricing models vary from fulfillment company to fulfillment company, but normally consist of per item fees, per pallet fees, or dimensional storage fees based on volume required.

Unless a seller ships thousands of items per month, the seller is unlikely to get the beneficial "bulk" shipping rates available to many fulfillment companies. For some fulfillment companies, the savings associated with shipping bulk rates provided by fulfillment companies can outweigh the charges of the fulfillment company itself. Fulfillment companies may also be able to negotiate a flat-rate for shipping, which is a single fee based on weight and service, as opposed to weight, service, and destination. This makes shipping expenses predictable, which makes budgeting easier.

Similar in concept to the savings associated with shipping costs, shipping materials bought in bulk also are purchased at more favorable rates. Often, fulfillment companies include the packaging fee in the cost of shipping, or per order. This is how fulfillment providers can quote "free packaging." Most order fulfillment service providers make a list of standard cartons available to their clients. A company whose product doesn't fit one these packages may need to provide their own packaging or pay an additional fee.

Fulfillment companies typically charge standardized fees per order and per item shipped. A key advantage for sellers is that these standardized fees cover many additional fulfillment services and duties including, but not limited to, the following: receiving merchandise, receiving orders via mail order, managing continuity ("autoship") programs, processing credit cards, receiving and restocking all returned materials, preparing specialized customs documentation for international shipments, providing all reports as required by client, inspecting returned merchandise, updating seller's database for returns, issuing end customer refunds or credit, restocking undamaged returned merchandise, responding to chargebacks, making bank deposits on behalf of the seller, answering customer service phone calls, responding to customer e-mail correspondence, storage of customer finished goods and work-in-progress materials, etc.

As will be apparent to one of ordinary skill in the art in light of having read the present specification, some embodiments apply to electronic commerce transactions between a buyer and a seller without the involvement of third party user communities.

As will be apparent to one of ordinary skill in the art in light of having read the present specification, some embodiments apply to electronic commerce transactions between a buyer and a seller with the involvement of one or more third party user communities.

As will be apparent to one of ordinary skill in the art in light of having read the present specification, some embodiments apply to electronic commerce transactions between a buyer and a seller without the involvement of a fulfillment entity.

As will be apparent to one of ordinary skill in the art in light of having read the present specification, some embodiments apply to electronic commerce transactions between a buyer and a seller with the involvement of a fulfillment entity.

As used herein, a reward is a good or service, which may be tangible, intangible or virtual, that has not been requested or purchased by the end user and is believed to be of value to the user, whether that value is intrinsic or extrinsic. An example of extrinsic value is an enhancement of value that is monetarily quantifiable. An example of intrinsic value is an enhancement of value that is not monetarily quantifiable. A reward may be personalized or generic, depending on the embodiment. Examples include engravings, autographs, unique avatars, etc.

As used herein, a surprise reward is a reward, as used above, for which the user is not provided by the seller with an expectation or reason to anticipate the reward.

As used herein a jackpot reward is a reward that is non-linearly scaled relative to the purchase or behavior to which it is associated. An example of a jackpot reward is payment of $1000.00 for the $1000^{th}$ comment on a blog.

As used herein, a surprise jackpot is a jackpot reward that is also a surprise reward.

As will be apparent to one of ordinary skill in the art in light of having read the present specification, some embodiments focus exclusively on modifications to orders that are performed after the user completes the process of placing and finalizing the order but before the ordered goods or services are delivered to the user. Thus, in some embodiments, after the user has approved the order, but before the order is delivered to the user, the order is changed in a manner that rewards the user for behavior according to rules unknown to the user, to create a surprise incentive for the behavior that is to be incentivized. And as taught in the materials incorporated herein, the use of surprise reward incentivizes desired behaviors and reinforced. Throughout this document, positive reinforcement is described, but, as will be apparent to one of ordinary skill in the art in light of having read the present specification, the techniques of the present invention can be applied in some embodiments to dis-incentivize undesired behaviors.

SUMMARY

Some embodiments present systems, methods and apparatus for incentivizing commercial behavior of a member of a user community through monitoring by a fulfillment entity user behavior associated with the user community. In some embodiments, a fulfillment entity receives over an electronic interface from a merchant website associated with a third-party online user community an order from a member of the user community for an item from the merchant website. During order processing, a set of rules or algorithms for rewarding members of the third-party online user community based on the past behaviors of one or more members of the user community are evaluated. These rules or algorithms for rewarding members of the third-party online user community—created by the merchant and/or the fulfillment entity—may be known or unknown to members of said community or to the end user making the purchase. Responsive to a condition fulfilling one of the rules, the member order is modified to provide an incentivizing reward to the member of the online user community, which may be a surprise to the member. The receipt of a surprise reward (which is unexpected), or "jackpot" reward (which is surprising because of its generosity), is believed by some psychologists and psychiatrists to have abrupt and long-reaching positive effects in reinforcing desirable behaviors.

BRIEF DESCRIPTION OF THE DRAWINGS

FIGS. 8A-8J are a feature relationship diagram for rewarding and reinforcing desirable consumer behaviors, according to some embodiments.

Figure 1:
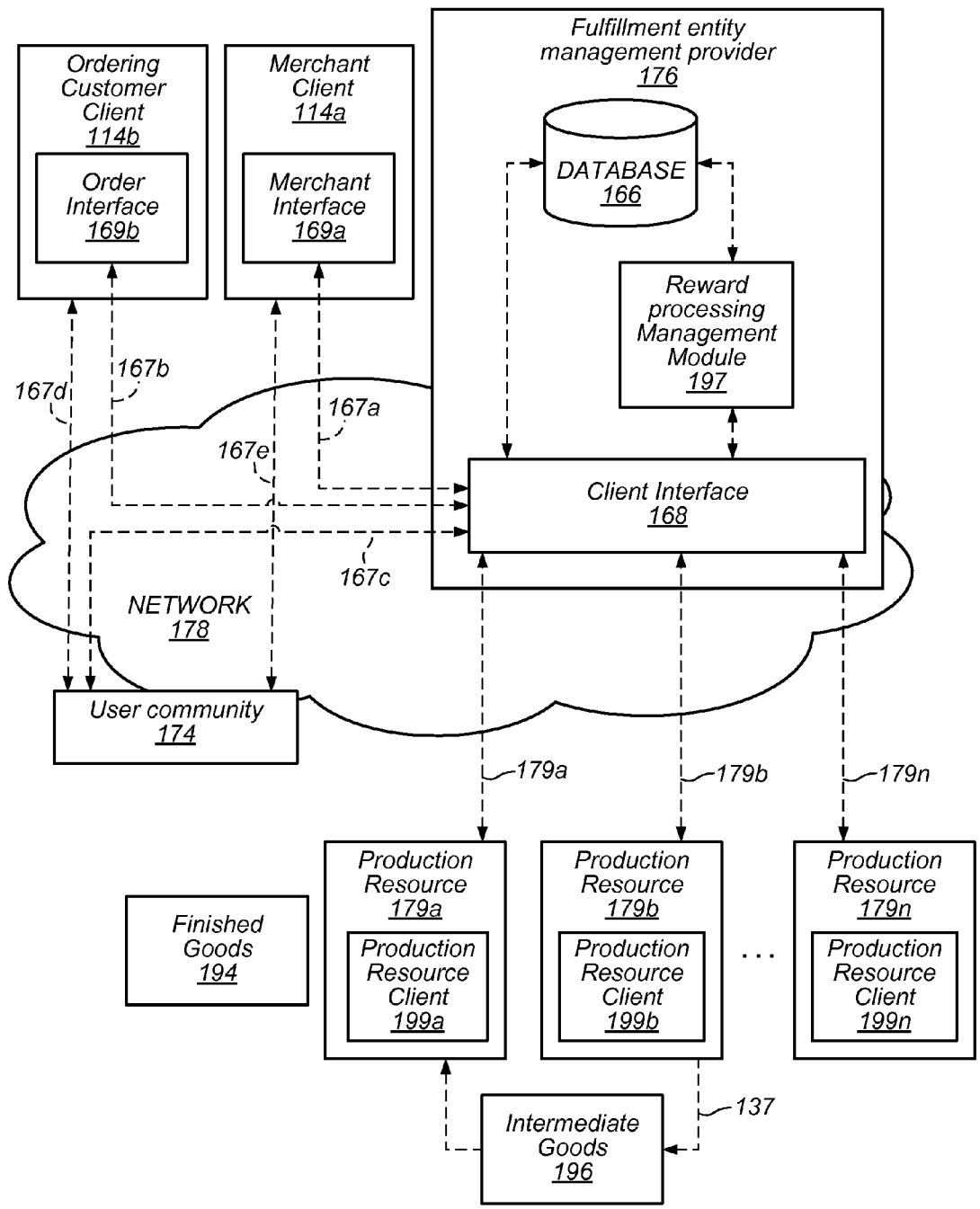
FIG. 1 illustrates a distributed system that may implement rewarding and reinforcing desirable consumer behaviors, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Brief Introduction to Reinforcing Desirable Consumer Behaviors with Surprise Rewards Some embodiments present systems, methods and apparatus for incentivizing commercial behavior of a member of a user community through monitoring by a fulfillment entity user behavior associated with the user community. In some embodiments, a fulfillment entity receives over an electronic interface from a merchant website associated with a third-party online user community an order from a member of the user community for an item from the merchant website. During order processing, a set of rules for rewarding members of the third-party online user community based on the past behaviors of one or more members of the user community is evaluated. Responsive to a condition fulfilling one of the rules, the member order is modified to provide an incentivizing reward to the member of the online user community.

In some embodiments, the modifying the order to provide the incentivizing reward to the member of the online user community further include holding an order for a discretionary manual assessment by the fulfillment entity of an appropriate incentivizing reward, applying the incentivizing reward based on discretionary manual assessment, and releasing the order with inclusion of the incentivizing reward.

Some embodiments incorporate the theories and techniques of behavior modification and reinforcement, including but not limited to, the use of rewards, surprise rewards and jackpot rewards as described in Don't Shoot the Dog!: The New Art of Teaching and Training by Karen Prior: Publisher: Ringpress Books; 3rd edition (Nov. 1, 2006), ISBN-13: 978-1860542381, the content of which is incorporated by reference herein in its entirety and for all purposes.

In some embodiments, the evaluating the set of rules for rewarding the members of the third-party online user community based on the behaviors of one or more members of the user community further includes evaluating input from members of the third-party online user community with respect to the member of the user community identified as recipient of the order for the item from the merchant website. In some embodiments, the modifying the order to provide the incentivizing reward to the member of the online user community further includes applying the incentivizing reward based on a set of community input rules correlating a set of incentivizing rewards to the input from members of the third-party online user community and releasing the order with inclusion of the incentivizing reward.

In some embodiments, the set of rules or algorithms includes a set of rules for rewarding members of the third-party online user community based on individual behaviors of the member, and each rule of the set of rules describes an individual behavior of a member of the user community and a resulting reward activity for performance by the fulfillment entity upon receipt of an indication of performance of the individual behavior by the member of the user community. These rules may be known or unknown to members of the third-party online user community.

In some embodiments, the fulfillment entity electronically monitors the individual attributes of members of the user community for a possession by the member of the user community of an individual attribute described in a selected rule. In some embodiments, responsive to possession by the member of the user community of the individual attribute described in the selected rule, the fulfillment entity performs a resulting incentivizing reward activity described in the selected rule.

In some embodiments, the fulfillment entity electronically monitors the attributes of members of the user community for a performance by one or more members of the user community of behavior described in a selected rule. In some embodiments, responsive to performance by the one or more members of the user community of the behavior described in the selected rule, the fulfillment entity performs a resulting incentivizing reward activity described in the selected rule.

In some embodiments, the fulfillment entity electronically monitors the individual attributes of members of the user community for a performance by a member of the user community of an individual behavior described in a selected rule. In some embodiments, responsive to performance by a member of the user community of an individual behavior described in the selected rule, the fulfillment entity performs a resulting incentivizing reward activity described in the selected rule.

Some embodiments include a system for producing items using dynamically assigned production resources. In some embodiments, the system includes a processor and program instructions computer-executable to cause the processor to cause the processor to receive over an electronic interface from a merchant website associated with a third-party online user community an order from a member of the user community for an item from the merchant website, during order processing, evaluate a set of rules for rewarding members of the third-party online user community based on the past behaviors of one or more members of the user community, and responsive to a condition fulfilling one of the rules, modify the member order to provide an incentivizing reward to the member of the online user community.

In some embodiments, the program instructions computer-executable to cause the processor to modify the order to provide the incentivizing reward to the member of the online user community further include program instructions computer-executable to cause the processor to hold an order for a discretionary manual assessment by a fulfillment entity of an appropriate incentivizing reward, program instructions computer-executable to cause the processor to apply the incentivizing reward based on discretionary manual assessment, and program instructions computer-executable to cause the processor to release the order with inclusion of the incentivizing reward.

In some embodiments, the program instructions computer-executable to cause the processor to evaluate the set of rules for rewarding the members of the third-party online user community based on the behaviors of one or more members of the user community further include program instructions computer-executable to cause the processor to evaluate input from members of the third-party online user community with respect to the member of the user community identified as recipient of the order for the item from the merchant website, and the program instructions computer-executable to cause the processor to modify the order to provide the incentivizing reward to the member of the online user community further include program instructions computer-executable to cause the processor to apply the incentivizing reward based on a set of community input rules correlating a set of incentivizing rewards to the input from members of the third-party online user community and program instructions computer-executable to cause the processor to release the order with inclusion of the incentivizing reward.

In some embodiments, the set of rules includes a set of rules for rewarding members of the third-party online user community based on individual behaviors of the member, and each rule of the set of rules describes an individual behavior of a member of the user community and a resulting reward activity for performance by the fulfillment entity upon receipt of an indication of performance of the individual behavior by the member of the user community.

Some embodiments further include program instructions computer-executable to cause the processor to facilitate the fulfillment entity electronically monitoring the individual attributes of members of the user community for a possession by the member of the user community of an individual attribute described in a selected rule. Some embodiments further include program instructions computer-executable to cause the processor to, responsive to possession by the member of the user community of the individual attribute described in the selected rule, facilitate the fulfillment entity performing a resulting incentivizing reward activity described in the selected rule.

Some embodiments further include program instructions computer-executable to cause the processor to facilitate the fulfillment entity electronically monitoring the attributes of members of the user community for a performance by one or more members member of the user community of behavior described in a selected rule. Some embodiments further include program instructions computer-executable to cause the processor to, responsive to performance by the one or more members of the user community of the behavior described in the selected rule, facilitate the fulfillment entity performing a resulting incentivizing reward activity described in the selected rule.

Some embodiments further include program instructions computer-executable to cause the processor to facilitate the fulfillment entity electronically monitoring the individual attributes of members of the user community for a performance by a member of the user community of an individual behavior described in a selected rule. Some embodiments further include program instructions computer-executable to cause the processor to, responsive to performance by a member of the user community of an individual behavior described in the selected rule, facilitate the fulfillment entity performing a resulting incentivizing reward activity described in the selected rule.

Some embodiments provide a non-transitory computer-readable storage medium storing program instructions. In some embodiments, the program instructions are computer-executable to implement a fulfillment entity receiving over an electronic interface from a merchant website associated with a third-party online user community an order from a member of the user community for an item from the merchant website. In some embodiments, the program instructions are computer-executable to implement, during order processing, evaluating a set of rules for rewarding members of the third-party online user community based on the past behaviors of one or more members of the user community. In some embodiments, the program instructions are computer-executable to implement, responsive to a condition fulfilling one of the rules, modifying the member order to provide an incentivizing reward to the member of the online user community.

In some embodiments, the program instructions computer-executable to implement modifying the order to provide the incentivizing reward to the member of the online user community further include program instructions computer-executable to implement holding an order for a discretionary manual assessment by the fulfillment entity of an appropriate incentivizing reward, program instructions computer-executable to implement applying the incentivizing reward based on discretionary manual assessment and program instructions computer-executable to implement releasing the order with inclusion of the incentivizing reward.

In some embodiments, the program instructions computer-executable to implement evaluating the set of rules for rewarding the members of the third-party online user community based on the behaviors of one or more members of the user community further include program instructions computer-executable to implement evaluating input from members of the third-party online user community with respect to the member of the user community identified as recipient of the order for the item from the merchant website. In some embodiments, the program instructions computer-executable to implement modifying the order to provide the incentivizing reward to the member of the online user community further include program instructions computer-executable to implement applying the incentivizing reward based on a set of community input rules correlating a set of incentivizing rewards to the input from members of the third-party online user community and program instructions computer-executable to implement releasing the order with inclusion of the incentivizing reward.

In some embodiments, the set of rules includes a set of rules for rewarding members of the third-party online user community based on individual behaviors of the member. In some embodiments, each rule of the set of rules describes an individual behavior of a member of the user community and a resulting reward activity for performance by the fulfillment entity upon receipt of an indication of performance of the individual behavior by the member of the user community.

Some embodiments further include program instructions computer-executable to implement the fulfillment entity electronically monitoring the individual attributes of members of the user community for a possession by the member of the user community of an individual attribute described in a selected rule and program instructions computer-executable to implement, responsive to possession by the member of the user community of the individual attribute described in the selected rule, the fulfillment entity performing a resulting incentivizing reward activity described in the selected rule.

Some embodiments further include program instructions computer-executable to implement the fulfillment entity electronically monitoring the attributes of members of the user community for a performance by one or more members member of the user community of behavior described in a selected rule and program instructions computer-executable to implement responsive to performance by the one or more members of the user community of the behavior described in the selected rule, the fulfillment entity performing a resulting incentivizing reward activity described in the selected rule.

Some embodiments present systems, methods and apparatus for incentivizing commercial behavior by members of a user community through monitoring of the user behavior by a fulfillment entity. In some embodiments, a fulfillment entity receives over an electronic interface from a third-party online user community a set of personalization rules for rewarding members of the third-party online user community based on individual behaviors of members of the user community. In some embodiments, each personalization rule of the set of personalization rules describes an individual behavior of a member of the user community and a resulting reward personalization activity for performance by the fulfillment entity upon receipt of an indication of performance of the individual behavior by the member of the user community. In some embodiments, the fulfillment entity electronically monitors the individual behaviors of members of the user community for a performance by a member of the user community of an individual behavior described in a selected rule. In some embodiments, responsive to performance by a member of the user community of an individual behavior described in the selected rule, the fulfillment entity performs a resulting reward personalization activity described in the selected rule.

In some embodiments, a physical user identification token is associated to a product sent to the individual user by the fulfillment entity. In some embodiments, the fulfillment entity electronically monitoring the individual behaviors of members of the user community for the performance by a member of the user community of an individual behavior described in a selected rule further includes, monitoring a geographic area for the appearance in the geographic area of the physical user identification token. In some embodiments, the performance by the member of the user community of the individual behavior described in the selected rule includes the appearance in the geographic area of the physical user identification token. In some embodiments, the responsive to performance by the member of the user community of the individual behavior described in the selected rule, the fulfillment entity performing a resulting reward personalization activity described in the selected rule further includes signaling a reward vendor within the geographic area to provide a spot reward to the individual user within the geographic area.

Some embodiments further include creating a user profile for the individual user within the third-party online user community. In some embodiments, the fulfillment entity electronically monitoring the individual behaviors of members of the user community for the performance by a member of the user community of an individual behavior described in a selected rule further includes monitoring the third-party online user community for desirable behavior in the third-party online user community; In some embodiments, the performance by the member of the user community of the individual behavior described in the selected rule includes electronic message activity in the third-party online user community. In some embodiments, the responsive to performance by the member of the user community of the individual behavior described in the selected rule, the fulfillment entity performing a resulting reward personalization activity described in the selected rule further includes the fulfillment entity providing a reward to the individual user by performing the resulting reward personalization activity described in the selected rule.

Some embodiments further include creating user profile for the individual user within the third-party online user community. In some embodiments, the fulfillment entity electronically monitoring the individual behaviors of members of the user community for the performance by a member of the user community of an individual behavior described in a selected rule further includes monitoring the an electronic commerce website of the fulfillment entity for desirable behavior in the electronic commerce website of the fulfillment entity. In some embodiments the performance by the member of the user community of the individual behavior described in the selected rule includes purchase activity in the electronic commerce website of the fulfillment entity. In some embodiments, the responsive to performance by the member of the user community of the individual behavior described in the selected rule, the fulfillment entity performing a resulting reward personalization activity described in the selected rule further includes the fulfillment entity providing a reward to the individual user by performing the resulting reward personalization activity described in the selected rule.

In some embodiments, the fulfillment entity providing a reward to the individual user by performing the resulting reward personalization activity described in the selected rule includes modifying an order placed by the user in the electronic commerce website of the fulfillment entity to include an additional reward. Some embodiments further include creating user profile for the individual user within the third-party online user community. In some embodiments, the fulfillment entity electronically monitoring the individual behaviors of members of the user community for the performance by a member of the user community of an individual behavior described in a selected rule further includes monitoring the an electronic commerce website of the fulfillment entity for desirable profile attributes in at least one of the set of electronic commerce website of the fulfillment entity and the third-party online user community, and the performance by the member of the user community of the individual behavior described in the selected rule includes purchase activity in the electronic commerce website of the fulfillment entity. In some embodiments, the responsive to performance by the member of the user community of the individual behavior described in the selected rule, the fulfillment entity performing a resulting reward personalization activity described in the selected rule further includes the fulfillment entity providing a reward to the individual user by performing the resulting reward personalization activity described in the selected rule.

In some embodiments, responsive to performance by a member of the user community of the individual behavior described in the selected rule, the fulfillment entity alerts the third-party online user community to performance by the member of the user community of the individual behavior described in the selected rule for recognition of the resulting reward personalization activity described in the selected rule.

Some embodiments may include a means for incentivizing commercial behavior by members of a user community through monitoring of the user behavior by a fulfillment entity. For example, a module for incentivizing commercial behavior by members of a user community through monitoring of the user behavior by a fulfillment entity may receive over an electronic interface from a third-party online user community a set of personalization rules for rewarding members of the third-party online user community based on individual behaviors of members of the user community. In some embodiments, each personalization rule of the set of personalization rules describes an individual behavior of a member of the user community and a resulting reward personalization activity for performance by the fulfillment entity upon receipt of an indication of performance of the individual behavior by the member of the user community. In some embodiments, the module electronically monitors the individual behaviors of members of the user community for a performance by a member of the user community of an individual behavior described in a selected rule. In some embodiments, responsive to performance by a member of the user community of an individual behavior described in the selected rule, the module performs a resulting reward personalization activity described in the selected rule, as described herein.

The module for incentivizing commercial behavior by members of a user community through monitoring of the user behavior by a fulfillment entity may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving over an electronic interface from a third-party online user community a set of personalization rules for rewarding members of the third-party online user community based on individual behaviors of members of the user community. In some embodiments, each personalization rule of the set of personalization rules describes an individual behavior of a member of the user community and a resulting reward personalization activity for performance by the fulfillment entity upon receipt of an indication of performance of the individual behavior by the member of the user community. In some embodiments, the computer-readable storage medium may store program instructions executable by the one or more processors to cause the computing apparatus to perform electronically monitoring the individual behaviors of members of the user community for a performance by a member of the user community of an individual behavior described in a selected rule. In some embodiments, the computer-readable storage medium may store program instructions executable by the one or more processors to cause the computing apparatus to perform, responsive to performance by a member of the user community of an individual behavior described in the selected rule, a resulting reward personalization activity described in the selected rule, as described herein. Other embodiments of the network activity analytics processing module may be at least partially implemented by hardware circuitry and/or firmware stored, for example, in a non-volatile memory.

Some embodiments include a method for incentivizing commercial behavior of a member of a user community through monitoring by a fulfillment entity user behavior associated with the user community. In some embodiments, the method includes a fulfillment entity receiving over an electronic interface from a merchant website associated with a third-party online user community an order from a member of the user community for an item from the merchant website. In some embodiments, the method includes, during order processing, evaluating a set of rules for rewarding members of the third-party online user community, and responsive to a condition fulfilling one of the rules, modifying the member order to provide an incentivizing reward to the member of the online user community. In some embodiments, one or more terms of a rule prompting the inclusion of the incentivizing reward are not disclosed in advance to the user, such that the merchant intends the incentivizing reward to surprise the user. In some embodiments, the method includes the incentivizing reward is a tangible physical modification of a product included in the order. Non-limiting examples of an incentivizing reward that is a tangible physical modification of a product included in the order are a special paint coat applied to a product by a computer-controlled manufacturing machine under the direction of a system as described herein. Non-limiting examples of an incentivizing reward that is a tangible physical modification of a product included in the order are an engraving applied to a product by a computer-controlled finishing machine under the direction of a system as described herein.

Introduction to Use of Technical Terminology

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Implementations

FIG. 1 illustrates a distributed system that may implement rewarding and reinforcing desirable consumer behaviors, according to some embodiments. In some embodiments, a fulfillment entity management provider 176 that includes a client interface 168, a reward processing management module 197, and a database 166, among other components. In some embodiments, a fulfillment entity, such as fulfillment entity management provider 176 receives over an electronic interface, such as client interface 168, from a merchant website, such as order interface 169b (shown displayed on ordering customer client 114b) associated with a third-party online user community 174 an order 167b from a member of the user community 174 for an item from the merchant website. During order processing, a set of rules (e.g., in database 166) for rewarding members of the third-party online user community 174 based on the past behaviors of one or more members of the user community 174 is evaluated. Responsive to a condition fulfilling one of the rules, the member order is modified to provide an incentivizing reward to the member of the online user community 174. In some embodiments, the fulfillment entity may also be the same entity as the seller or community owner.

In some embodiments, the modified order 179a is then sent over a network 178 to a production resource 179a for fulfillment as finished goods 194. In some embodiments, the modifying the order 167b to provide the incentivizing reward to the member of the online user community 174 further includes holding the order for a discretionary manual assessment 167a, e.g., through a merchant interface 169a of a merchant client 114a, by the fulfillment entity of an appropriate incentivizing reward, applying the incentivizing reward based on discretionary manual assessment 167a, and releasing the order 179a with inclusion of the incentivizing reward.

In some embodiments, the evaluating the set of rules for rewarding the members of the third-party online user community 174 based on the behaviors of one or more members of the user community 174 further includes evaluating input 167c from members of the third-party online user community with respect to the member of the user community 174 identified as recipient of the order for the item from the merchant website, and the modifying the order to provide the incentivizing reward to the member of the online user community further includes applying the incentivizing reward based on a set of community input rules correlating a set of incentivizing rewards to the input from members of the third-party online user community 174, and releasing the order 179a with inclusion of the incentivizing reward. In some embodiments, the set of rules includes a set of rules for rewarding members of the third-party online user community based on individual behaviors 167d of the member, and each rule of the set of rules describes an individual behavior of a member of the user community 174 and a resulting reward activity for performance by the fulfillment entity upon receipt of an indication of performance of the individual behavior by the member of the user community. In some embodiments, the fulfillment entity 176 electronically monitors the individual attributes of members of the user community 174 for a possession by the member 114b of the user community 174 of an individual attribute described in a selected rule, and responsive to possession by the member of the user community of the individual attribute described in the selected rule, the fulfillment entity performs a resulting incentivizing reward activity, such as sending modified order 179a described in the selected rule.

In some embodiments, rules and algorithms include rules known to the online user community or customers. In some embodiments, rules and algorithms include rules unknown to the online user community or customers.

In some embodiments, the fulfillment entity 176 electronically monitors the attributes of members of the user community 174 for a performance by one or more members of the user community 174 of behavior described in a selected rule. Responsive to performance by the one or more members of the user community of the behavior described in the selected rule, the fulfillment entity 176 performing a resulting incentivizing reward activity described in the selected rule, such as sending order 179a described in the selected rule.

In some embodiments, the fulfillment entity 176 electronically monitors the attributes of members of the user community 174 for a performance by a member of the user community of an individual behavior described in a selected rule. Responsive to performance by a member of the user community of an individual behavior described in the selected rule, the fulfillment entity performing a resulting incentivizing reward activity described in the selected rule, such as sending order 179a described in the selected rule.

In some embodiments, the fulfillment entity management provider includes a production resource management module includes a production coordination module (not shown) capable of performing the functions described below with respect to a production resource management module and configured to, in the context of the activities described above with respect to a fulfillment entity management provider, deconstruct the item request from the customer into a plurality of order components, and construct a tentative assignment of the plurality of order components to the plurality of production resources 179a-179n running production resource clients 199a-199n. In some embodiments, the tentative assignment further includes for each of the plurality of order components, an identification of a task to be performed by a selected one of the plurality of production resources 199a-199n, such as production of finished goods 194 or of intermediate goods 196 for routing over transport links 137, and an accounting of any dependencies that exist between ones of the plurality of order components, and an expected scheduling of completion for each task.

Figure 2:
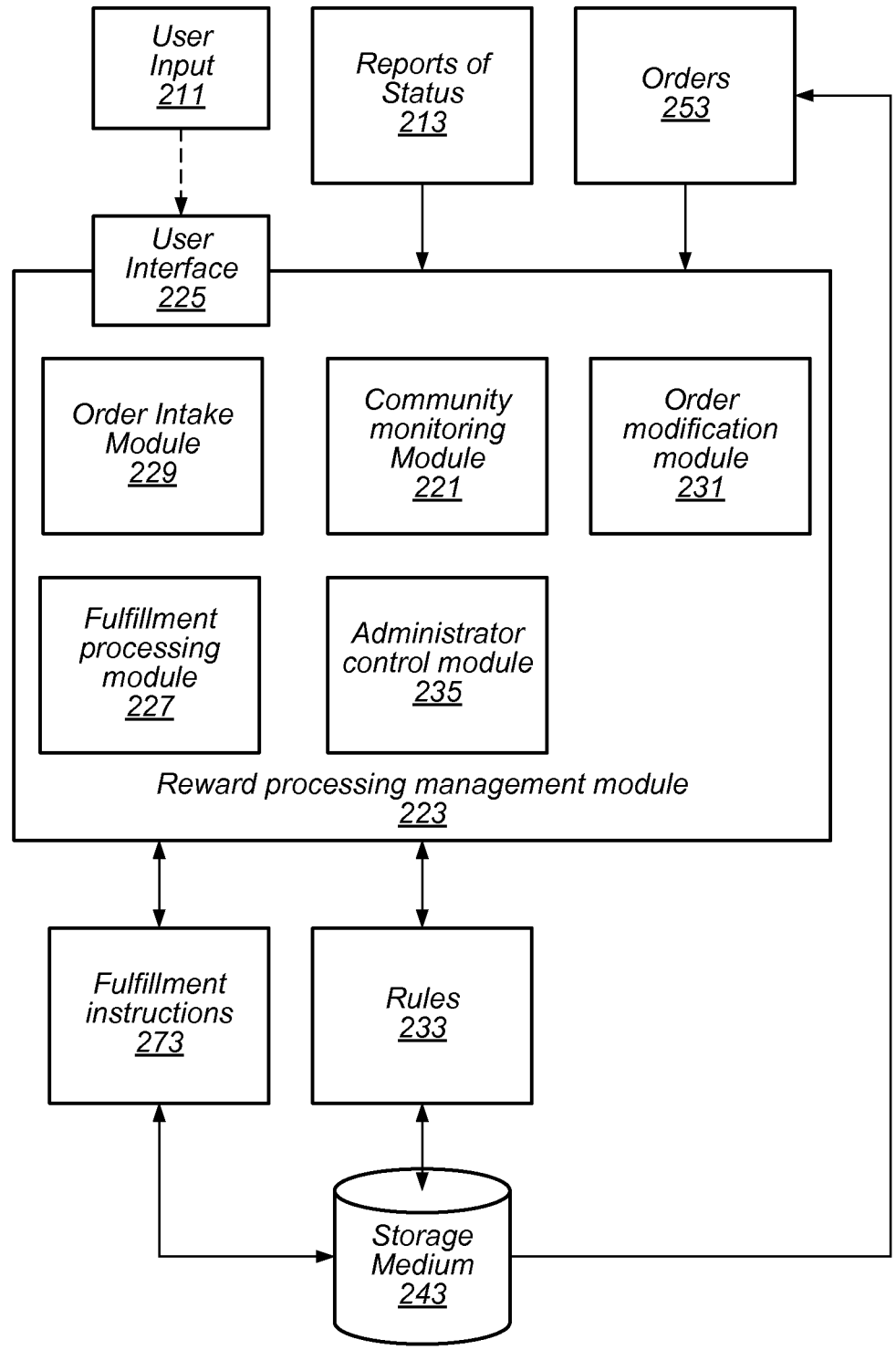
FIG. 2 depicts a module that may implement rewarding and reinforcing desirable consumer behaviors, according to some embodiments.

FIG. 2 depicts a module that may implement rewarding and reinforcing desirable consumer behaviors, according to some embodiments. In some embodiments, a reward processing management module 223 includes an order intake module 229, a user interface 225 for receiving user input 211, a fulfillment processing module 227, a community monitoring module 221, an order modification module 231, and an administrator control module 235. Reward processing management module 223 receives reports of status 213, orders 253, rules 233 and fulfillment instructions 273, each of which it may also store in a storage medium 243. In some embodiments, processing management module 223 is part of or executes a fulfillment entity and receives over an electronic interface, such as user interface 225, from a merchant website associated with a third-party online user community an order 253 from a member of the user community for an item from the merchant website. During order processing by an order intake module 229, a set of rules 233 for rewarding members of the third-party online user community based on the past behaviors of one or more members of the user community, received as reports of status 213 from the user of community, is evaluated by a community monitoring module 221. Responsive to a condition fulfilling one of the rules 233, the member order is modified by a fulfillment processing module 227 to provide an incentivizing reward to the member of the online user community.

In some embodiments, modifying the order 253 to provide the incentivizing reward to the member of the online user community further includes holding an order 253 for a discretionary manual assessment by the fulfillment entity through an administrator control module 235 of an appropriate incentivizing reward, and applying the incentivizing reward based on discretionary manual assessment, and releasing the order 253 as fulfillment instructions 273 with inclusion of the incentivizing reward.

In some embodiments, community monitoring module 221 evaluating the set of rules for rewarding the members of the third-party online user community based on the behaviors of one or more members of the user community further includes community monitoring module 211 evaluating user input 225 from members of the third-party online user community with respect to the member of the user community identified as recipient of the order 253 for the item from the merchant website. In some embodiments, the fulfillment processing module 227 modifying the order to provide the incentivizing reward to the member of the online user community further includes applying the incentivizing reward based on a set of community input rules correlating a set of incentivizing rewards to the input from members of the third-party online user community, and releasing the order as fulfillment instructions with inclusion of the incentivizing reward.

In some embodiments, the set of rules 233 comprises a set of rules for rewarding members of the third-party online user community based on individual behaviors of the member, and each rule of the set of rules describes an individual behavior of a member of the user community and a resulting reward activity for performance by the fulfillment entity upon receipt of an indication of performance of the individual behavior by the member of the user community.

Some embodiments further include the fulfillment entity electronically monitoring the individual attributes of members of the user community through community monitoring module 221 for a possession by the member of the user community of an individual attribute described in a selected rule 233. In some embodiments, responsive to possession by the member of the user community of the individual attribute described in the selected rule 233, the fulfillment entity performs a resulting incentivizing reward activity described in the selected rule by sending fulfillment instructions 273 from fulfillment processing module 227.

Some embodiments further include the fulfillment entity electronically monitoring the attributes of members of the user community through community monitoring module 221 for a performance by one or more members member of the user community of behavior described in a selected rule 233. In some embodiments, responsive to performance by the one or more members of the user community of the behavior described in the selected rule 233, the fulfillment entity performs a resulting incentivizing reward activity described in the selected rule 233 by sending fulfillment instructions 273 from fulfillment processing module 227.

Some embodiments further include the fulfillment entity electronically monitoring through community monitoring module 221 the individual attributes of members of the user community for a performance by a member of the user community of an individual behavior described in a selected rule 233. In some embodiments, responsive to performance by a member of the user community of an individual behavior described in the selected rule 233, the fulfillment entity performs a resulting incentivizing reward activity described in the selected rule 233 by sending fulfillment instructions 273 from fulfillment processing module 227.

Some embodiments of production resource management module 223 present systems, methods and apparatus for incentivizing commercial behavior by members of a user community through monitoring of the user behavior by a fulfillment entity. In some embodiments, a fulfillment entity receives over an electronic interface from a third-party online user community a set of personalization rules 233 for rewarding members of the third-party online user community based on individual behaviors of members of the user community. In some embodiments, each personalization rule 233 of the set of personalization rules 233 describes an individual behavior of a member of the user community and a resulting reward personalization activity, which can be sent from a fulfillment processing module as fulfillment instructions 273 for performance by the fulfillment entity upon receipt of an indication of performance of the individual behavior by the member of the user community. In some embodiments, the fulfillment entity electronically monitors through a community monitoring module 221 the individual behaviors of members of the user community for a performance by a member of the user community of an individual behavior described in a selected rule 233. In some embodiments, responsive to performance by a member of the user community of an individual behavior described in the selected rule, the fulfillment entity performs a resulting reward personalization activity described in the selected rule by sending fulfillment instructions 273 from fulfillment processing module 227.

In some embodiments, a physical user identification token is associated to a product sent to the individual user by the fulfillment entity in response to fulfillment instructions 273. In some embodiments, the fulfillment entity electronically monitoring the individual behaviors of members of the user community for the performance by a member of the user community of an individual behavior described in a selected rule 233 further includes, community monitoring module 221 monitoring a geographic area (via remote sensors) for the appearance in the geographic area of the physical user identification token. In some embodiments, the performance by the member of the user community of the individual behavior described in the selected rule 233 includes the appearance in the geographic area of the physical user identification token. In some embodiments, the responsive to performance by the member of the user community of the individual behavior described in the selected rule 233, the fulfillment entity performing a resulting reward personalization activity described in the selected rule further includes signaling a reward vendor through fulfillment instructions 273 (e.g., a signal such as a text or video message to a bartender at a bar serving as the fulfillment site) within the geographic area to provide a spot reward to the individual user within the geographic area (e.g., a free drink).

Some embodiments further include creating a user profile from user input 211 for the individual user within the third-party online user community. In some embodiments, the fulfillment entity electronically monitoring the individual behaviors of members of the user community for the performance by a member of the user community of an individual behavior described in a selected rule 233 further includes community monitoring module 221 monitoring the third-party online user community for desirable behavior in the third-party online user community. In some embodiments, the performance by the member of the user community of the individual behavior described in the selected rule 233 includes electronic message activity in the third-party online user community. In some embodiments, the responsive to performance by the member of the user community of the individual behavior described in the selected rule 233, the fulfillment entity performing a resulting reward personalization activity described in the selected rule further includes the fulfillment entity providing a reward to the individual user by performing the resulting reward personalization activity described in the selected rule 233 through fulfillment instructions 273.

Some embodiments further include community monitoring module 221 creating a user profile for the individual user within the third-party online user community. In some embodiments, the fulfillment entity electronically monitoring the individual behaviors of members of the user community for the performance by a member of the user community of an individual behavior described in a selected rule 233 further includes the community monitoring module 221 monitoring the an electronic commerce website of the fulfillment entity for desirable behavior in the electronic commerce website of the fulfillment entity. In some embodiments the performance by the member of the user community of the individual behavior described in the selected rule 233 includes purchase activity in the electronic commerce website of the fulfillment entity. In some embodiments, the responsive to performance by the member of the user community of the individual behavior described in the selected rule 233, the fulfillment entity performing a resulting reward personalization activity described in the selected rule further includes the fulfillment entity providing a reward to the individual user by performing the resulting reward personalization activity described in the selected rule 233, such as through fulfillment instructions 273.

In some embodiments, the fulfillment entity providing a reward to the individual user by performing the resulting reward personalization activity described in the selected rule includes modifying an order 253 placed by the user in the electronic commerce website of the fulfillment entity to include an additional reward as described in fulfillment instructions 273. Some embodiments further include creating user profile for the individual user based on user input 211 within the third-party online user community. In some embodiments, the fulfillment entity electronically monitoring the individual behaviors of members of the user community for the performance by a member of the user community of an individual behavior described in a selected rule 233 further includes community monitoring module 221 monitoring the an electronic commerce website of the fulfillment entity for desirable profile attributes in at least one of the set of electronic commerce website of the fulfillment entity and the third-party online user community, and the performance by the member of the user community of the individual behavior described in the selected rule includes purchase activity in the electronic commerce website of the fulfillment entity. In some embodiments, the responsive to performance by the member of the user community of the individual behavior described in the selected rule, the fulfillment entity performing a resulting reward personalization activity described in the selected rule further includes the fulfillment entity providing a reward to the individual user through fulfillment instructions 273 by performing the resulting reward personalization activity described in the selected rule.

In some embodiments, responsive to performance by a member of the user community of the individual behavior described in the selected rule 233, the fulfillment entity alerts the third-party online user community to performance by the member of the user community of the individual behavior described in the selected rule for recognition of the resulting reward personalization activity described in the selected rule.

Figure 3:
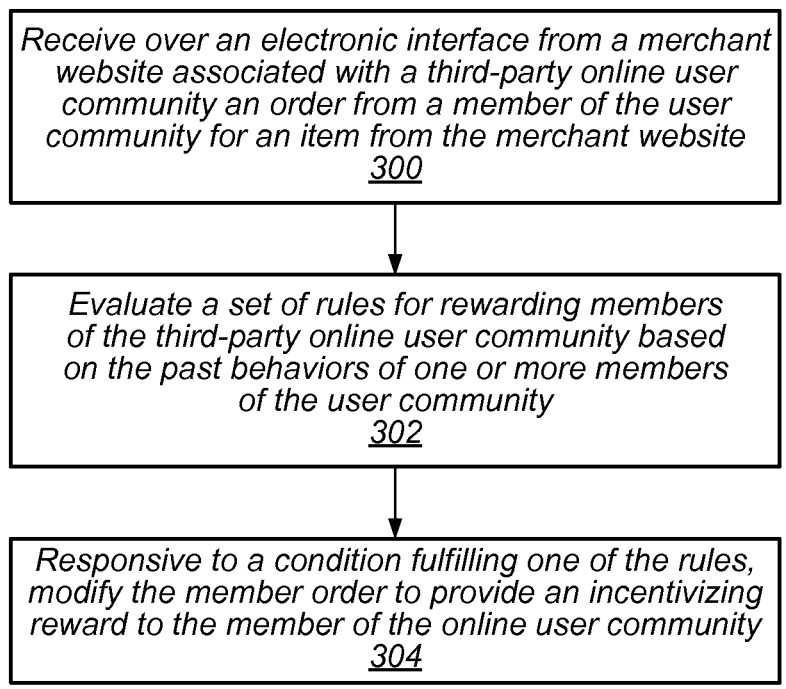
FIG. 3 is a flowchart of a process for rewarding and reinforcing desirable consumer behaviors, according to some embodiments.

FIG. 3 is a flowchart of a process for rewarding and reinforcing desirable consumer behaviors, according to some embodiments. An order is received over an electronic interface from a merchant website associated with a third-party online user community from a member of the user community for an item from the merchant website (block 300). A set of rules for rewarding members of the third-party online user community based on past behaviors of one or more members of the user community is evaluated (block 302). Responsive to a condition fulfilling one of the rules, the member order is modified to provide an incentivizing reward to the member of the online user community (block 304).

Figure 4:
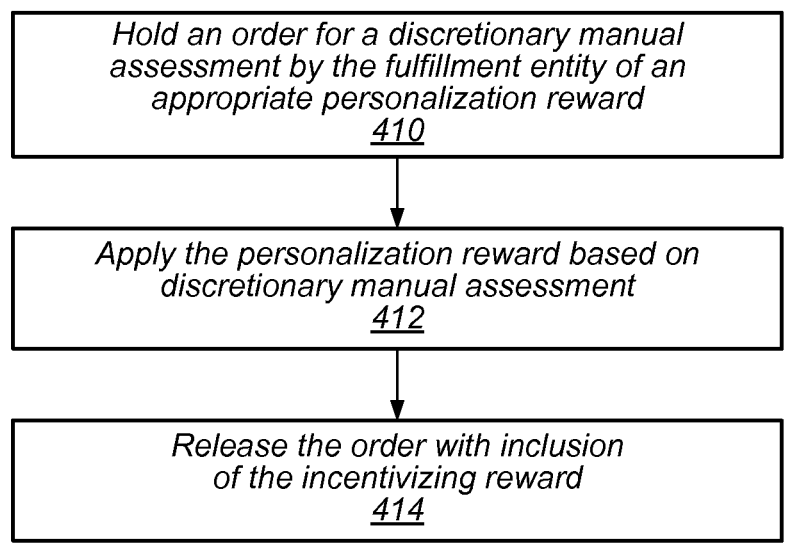
FIG. 4 is a flowchart of a process for rewarding and reinforcing desirable consumer behaviors, according to some embodiments.

FIG. 4 is a flowchart of a process for rewarding and reinforcing desirable consumer behaviors, according to some embodiments. An order is held for a discretionary manual assessment by the fulfillment entity of an appropriate personalization reward (block 410). The personalization reward is applied based on the discretionary manual assessment. (block 412). The order is released with inclusion of the incentivizing reward (block 414).

Figure 5:
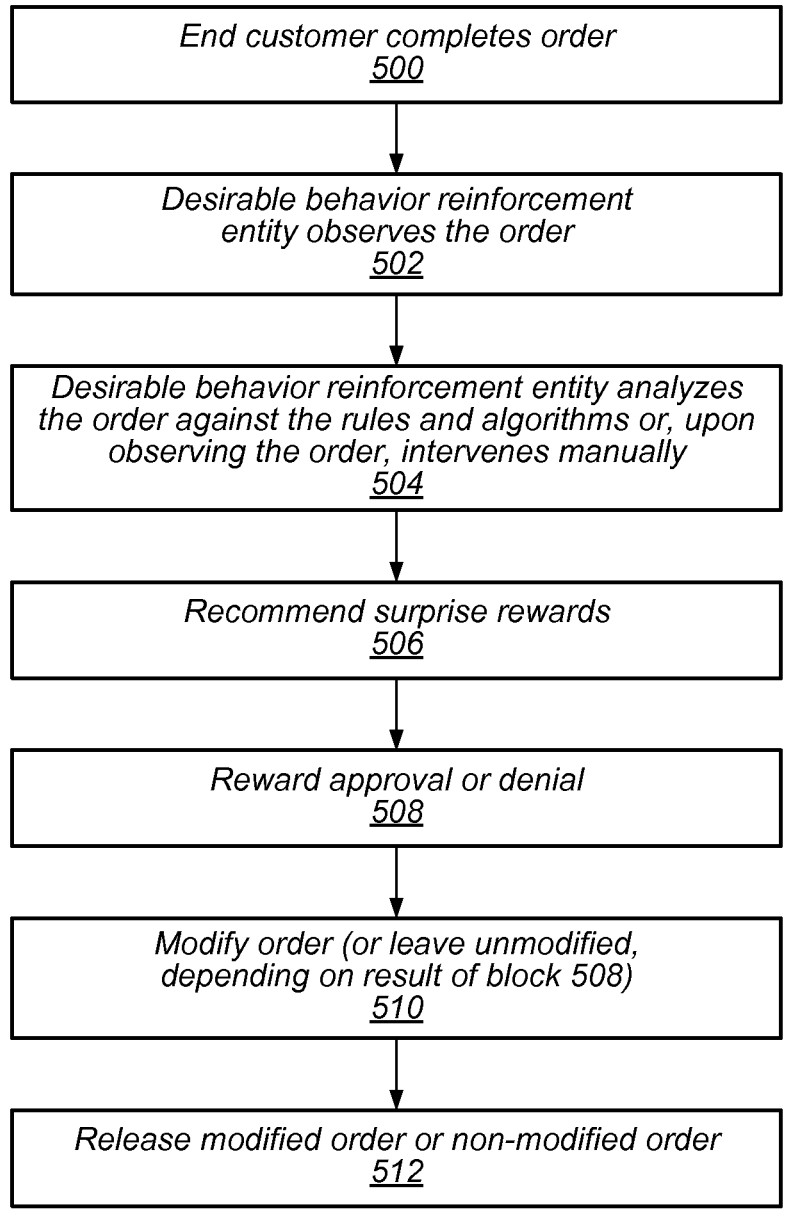
FIG. 5 is a flowchart of a process for rewarding and reinforcing desirable consumer behaviors, according to some embodiments.

FIG. 5 is a flowchart of a process for rewarding and reinforcing desirable consumer behaviors, according to some embodiments. An order is completed by an end customer (block 500). A desirable behavior reinforcement entity observes the order (block 502). The desirable behavior reinforcement entity analyzes the order against the rules and algorithms or, upon observing the order, intervenes manually (block 504). Surprise rewards are recommended (block 506). The rewards are approved or denied (block 508). The order is modified (or leave unmodified, depending on result of block 508) (block 510). The order, whether modified or unmodified, is released (block 512).

Figure 6:
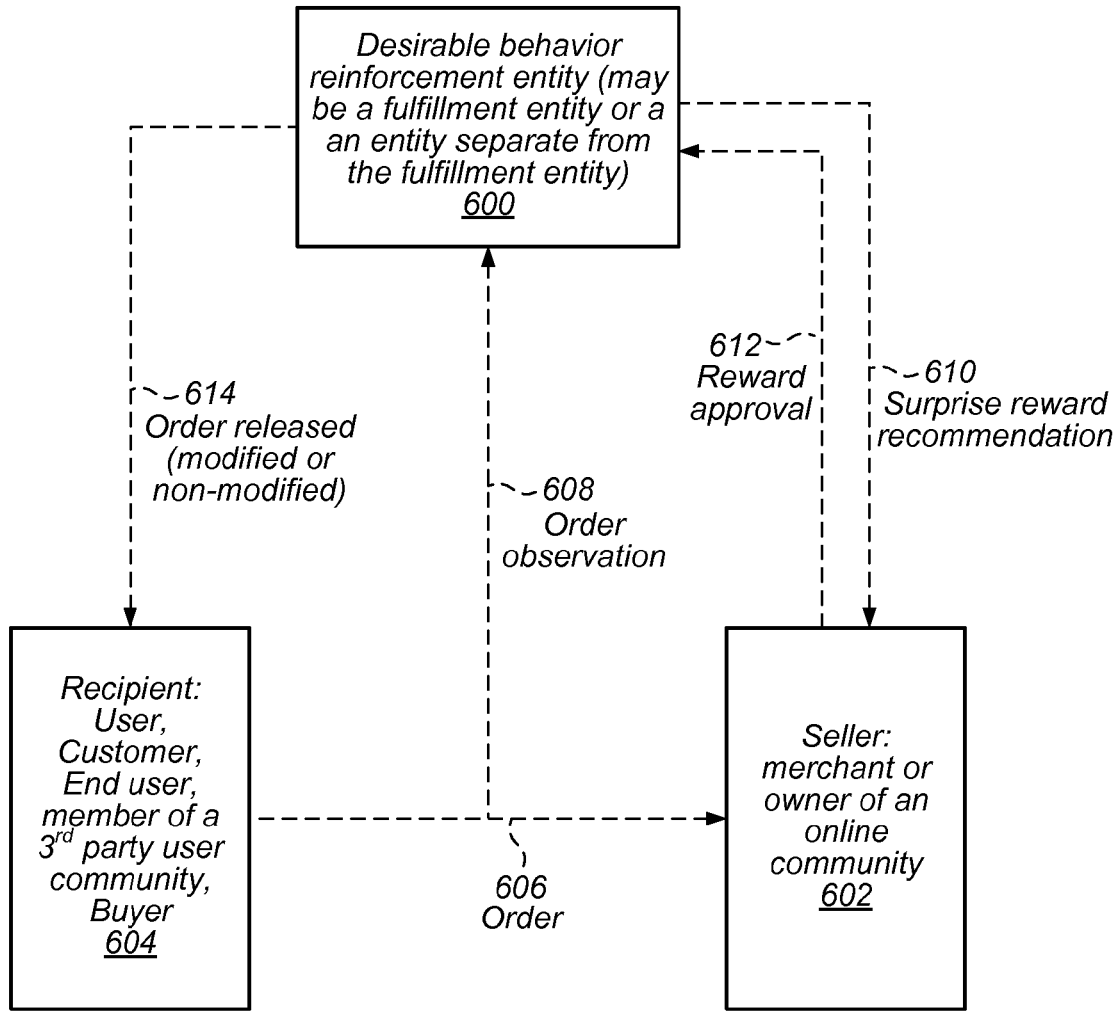
FIG. 6 is an entity relationship diagram for a process for rewarding and reinforcing desirable consumer behaviors, according to some embodiments.

FIG. 6 is an entity relationship diagram for a process for rewarding and reinforcing desirable consumer behaviors, according to some embodiments. The desirable behavior reinforcement entity 600 may be a separate entity, made of members of the user community or may even be made up of the seller 602. An order 606 is completed by an end customer 604. A desirable behavior reinforcement entity 600 observes the order 608. The desirable behavior reinforcement entity 600 analyzes the order against the rules and algorithms or, upon observing 608 the order 606, or may intervene manually. Surprise rewards may be recommended 610 and transmitted to seller 602. The rewards are approved or denied 612 by the seller 602. The order is modified (or left unmodified, depending on result of approval or denial and the order, whether modified or unmodified, is released 614 to the end user 604.

Figure 7:
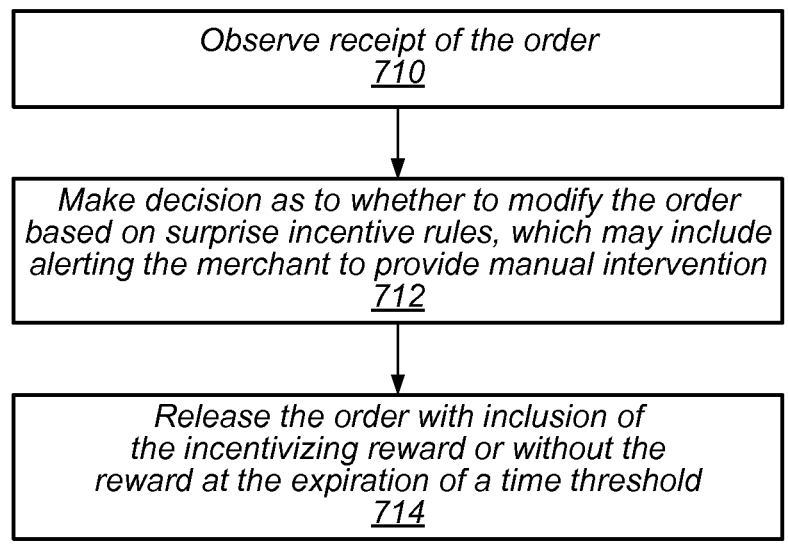
FIG. 7 is a flowchart of a process for rewarding and reinforcing desirable consumer behaviors, according to some embodiments.
Figure 8A:
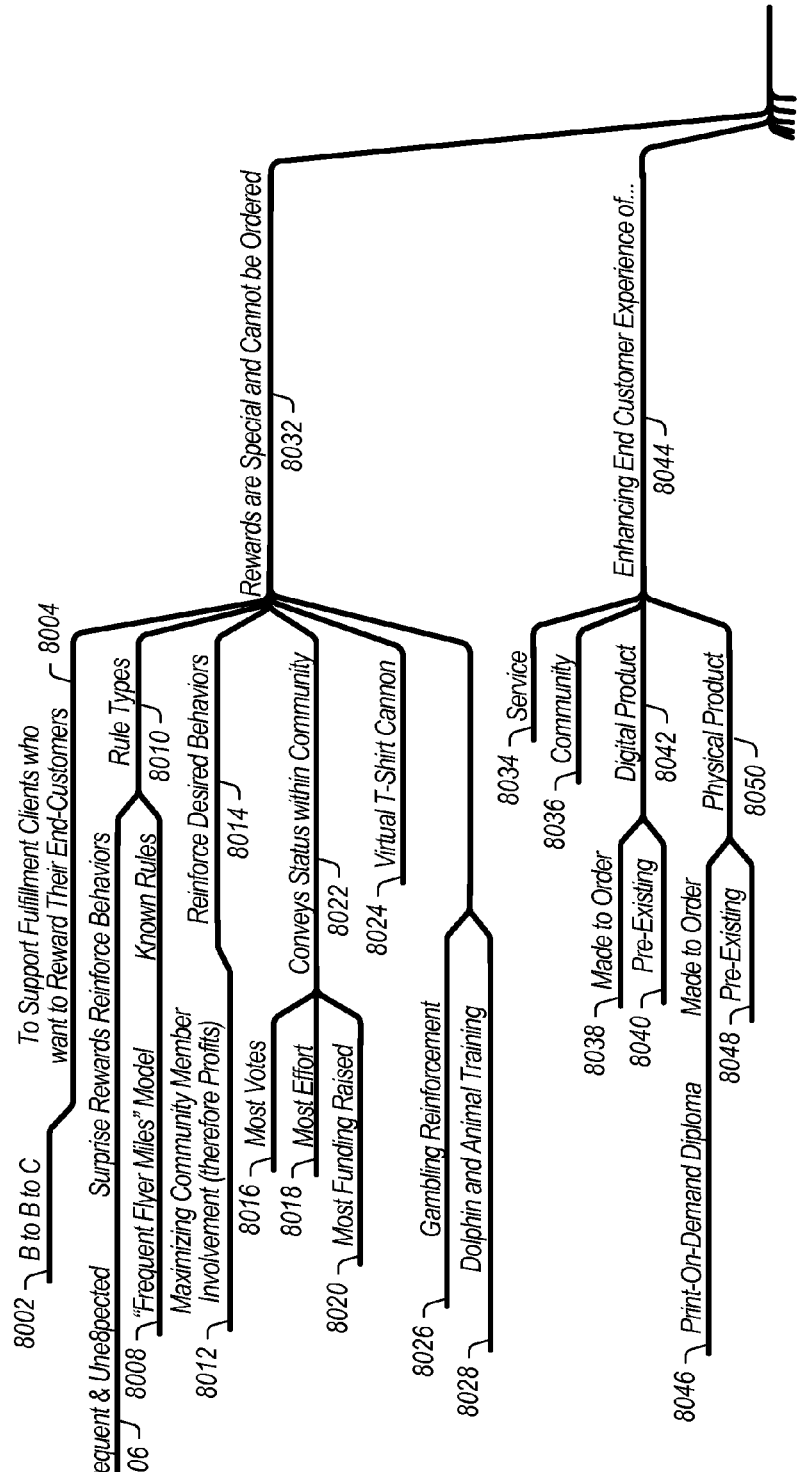
Figure 8B:
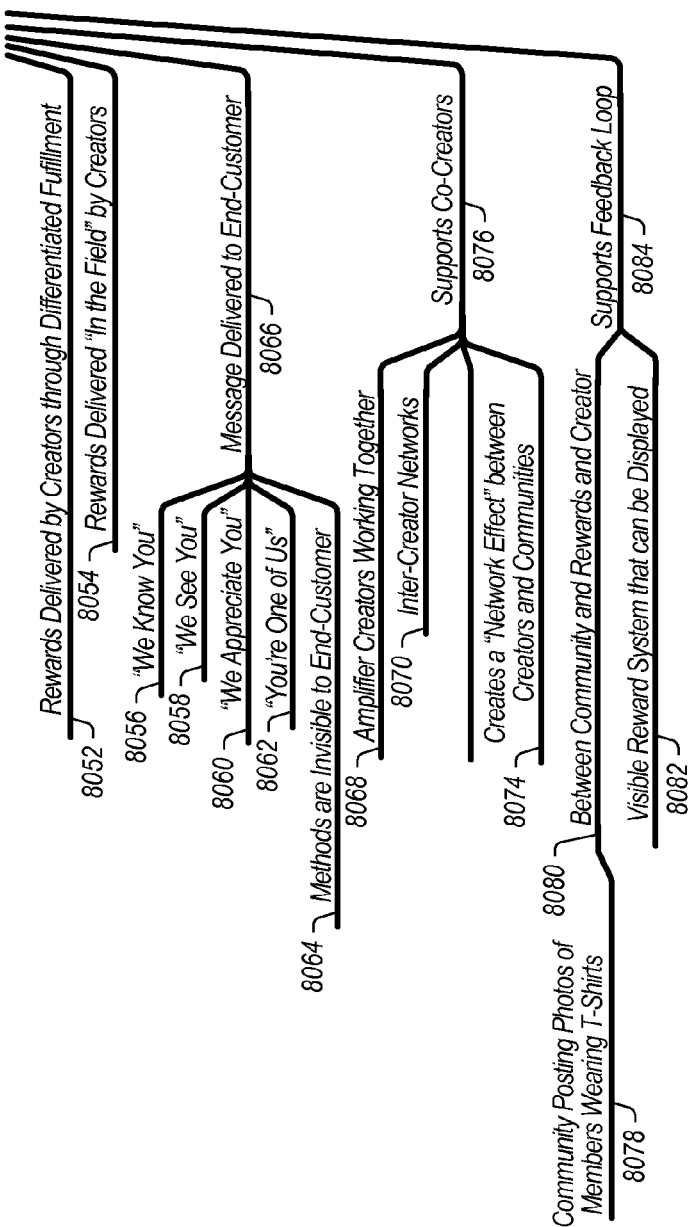
Figure 8C:
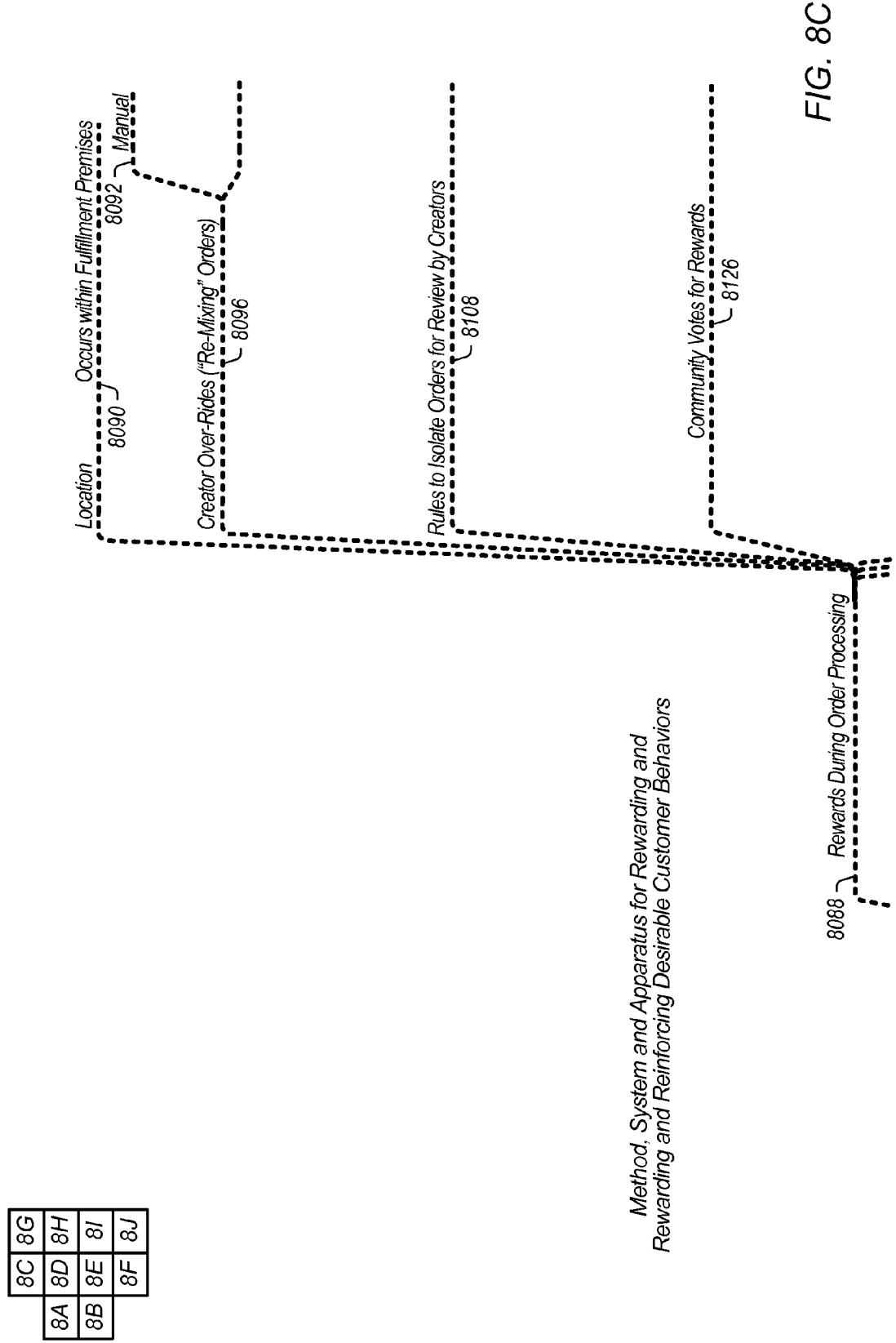
Figure 8D:
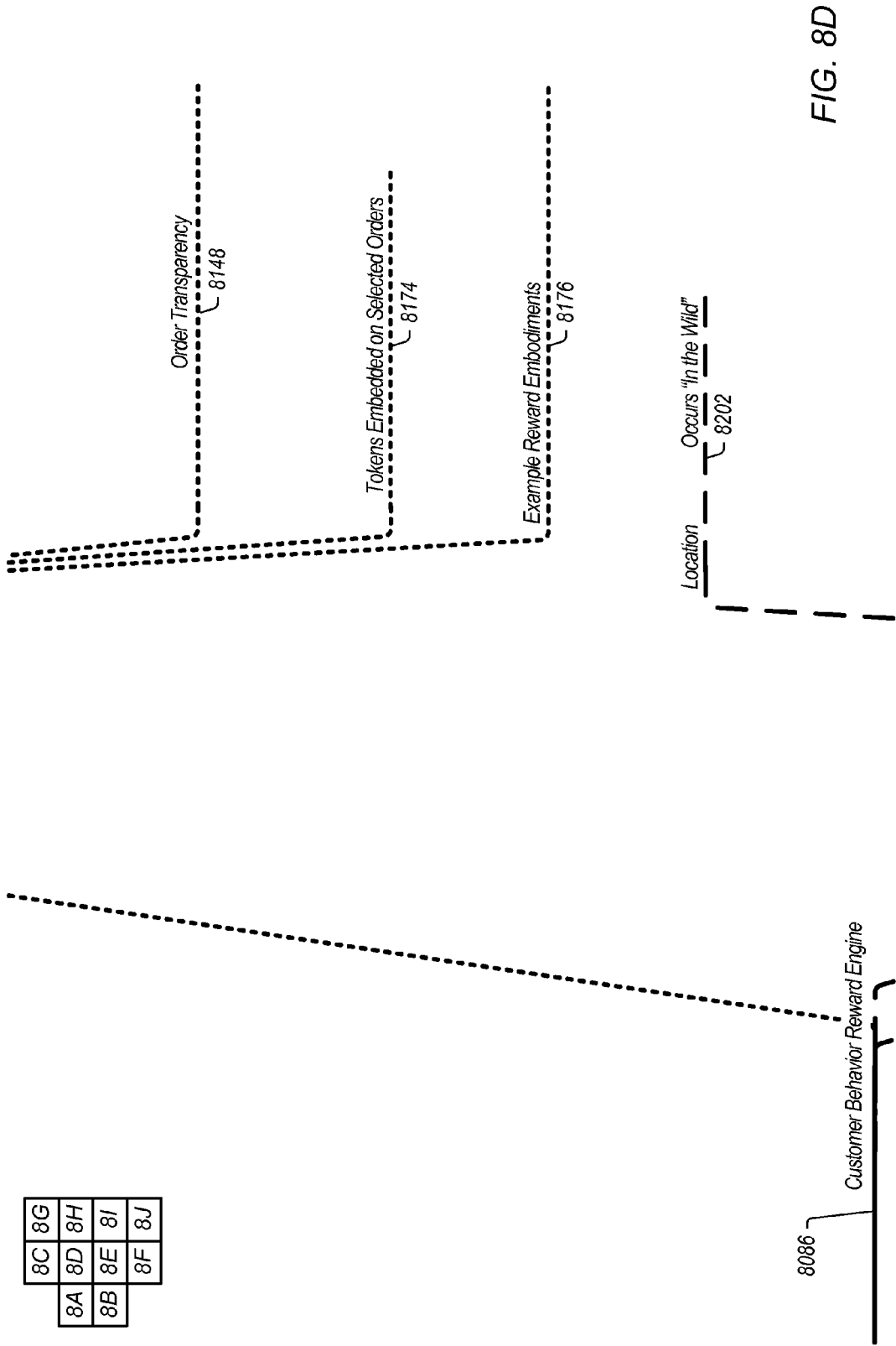
Figure 8E:
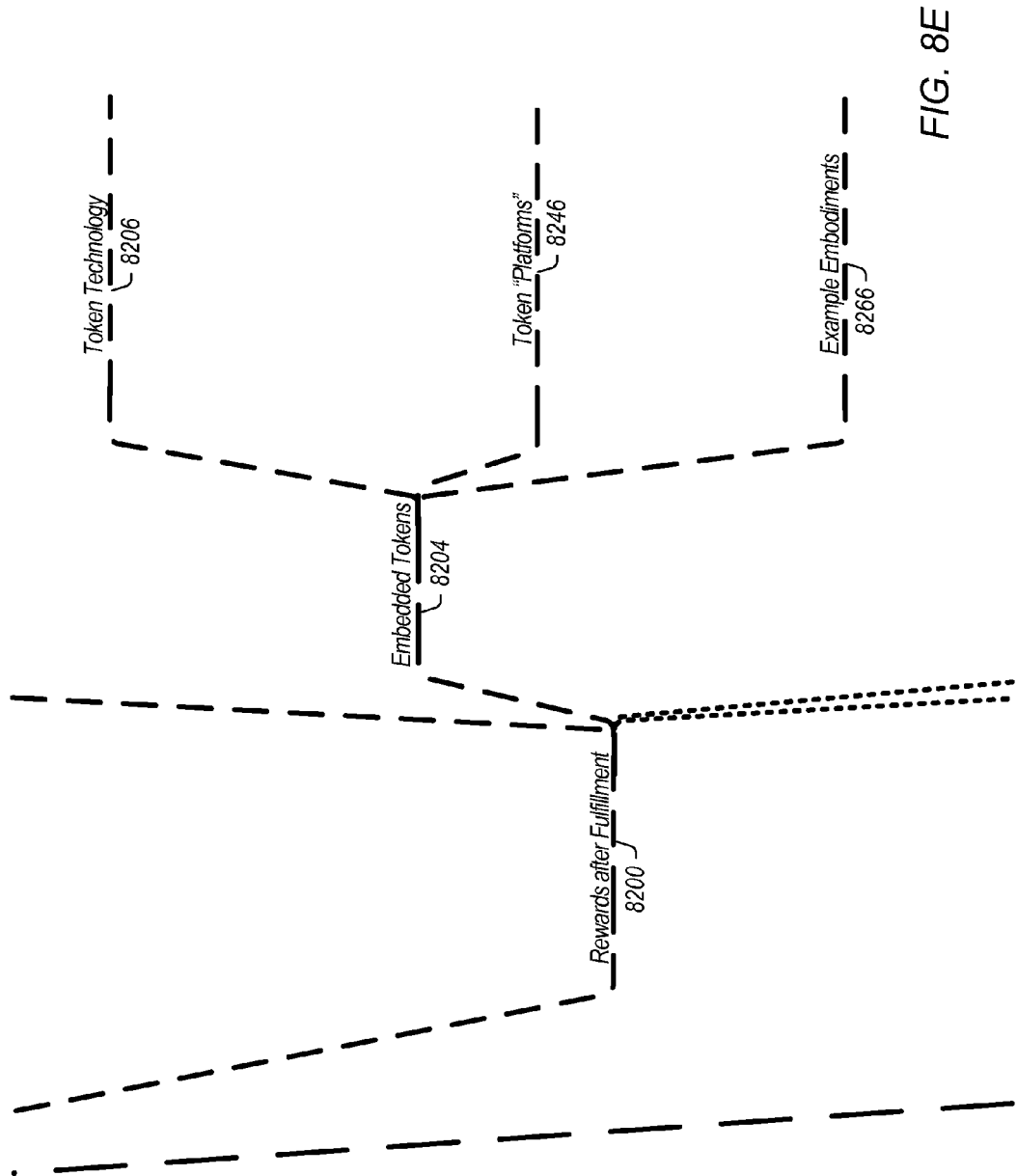
Figure 8F:
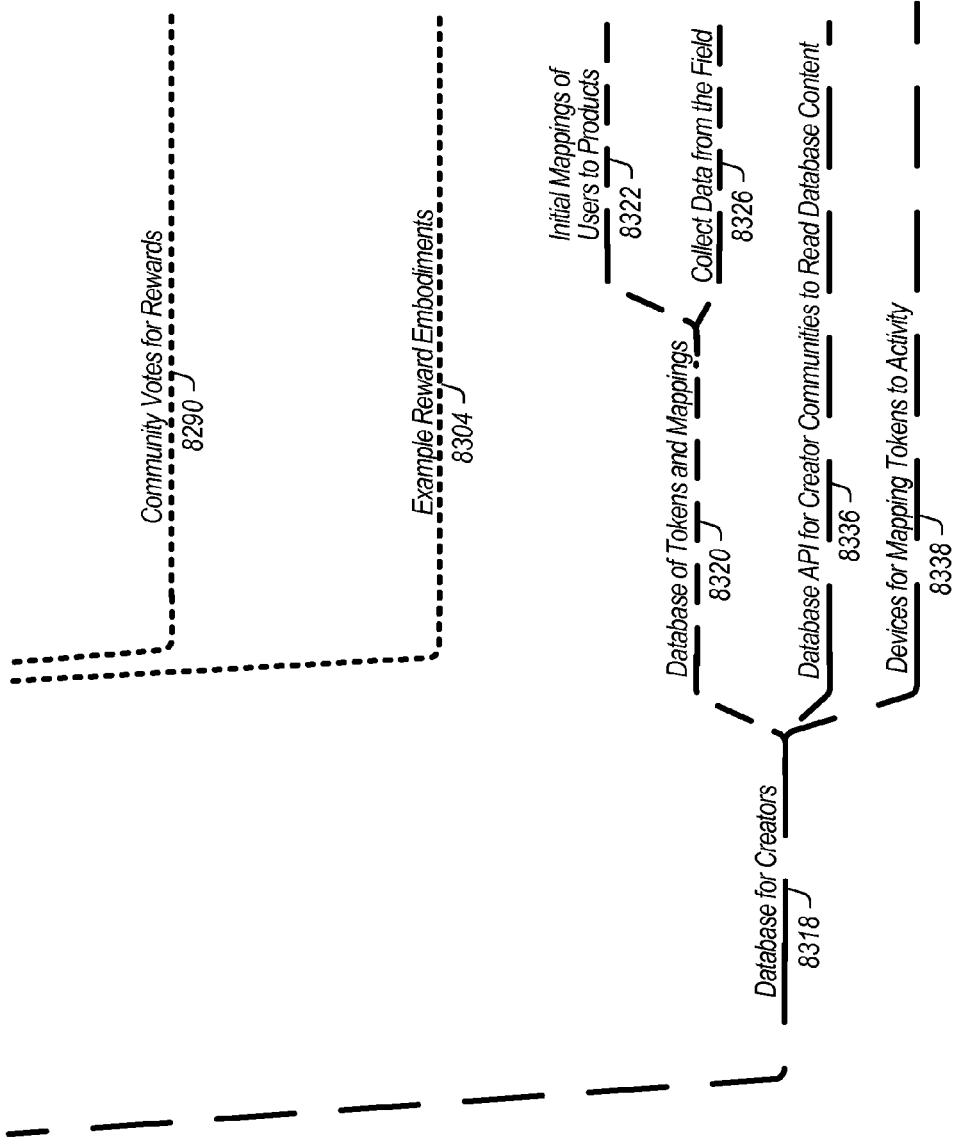
Figure 8G:
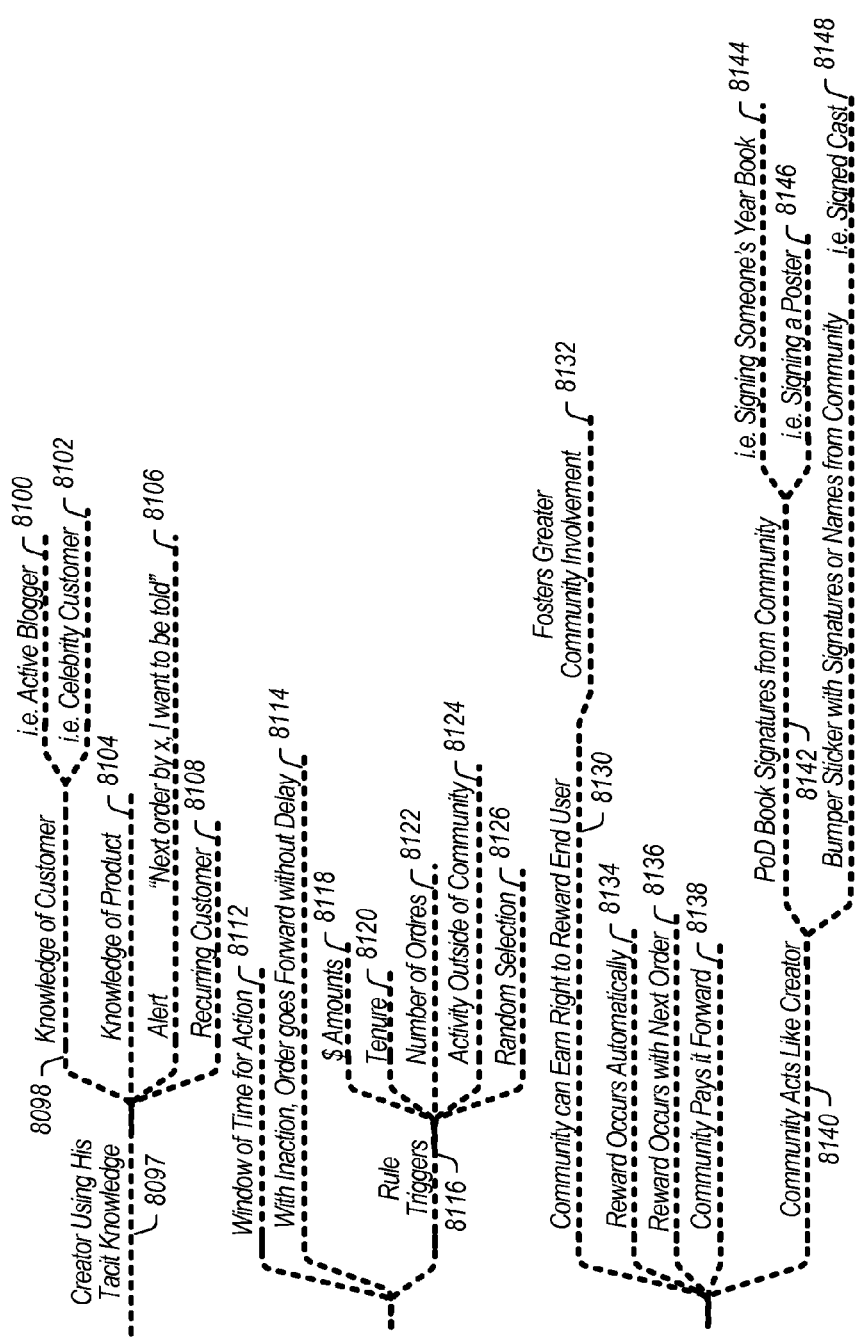
Figure 8H:
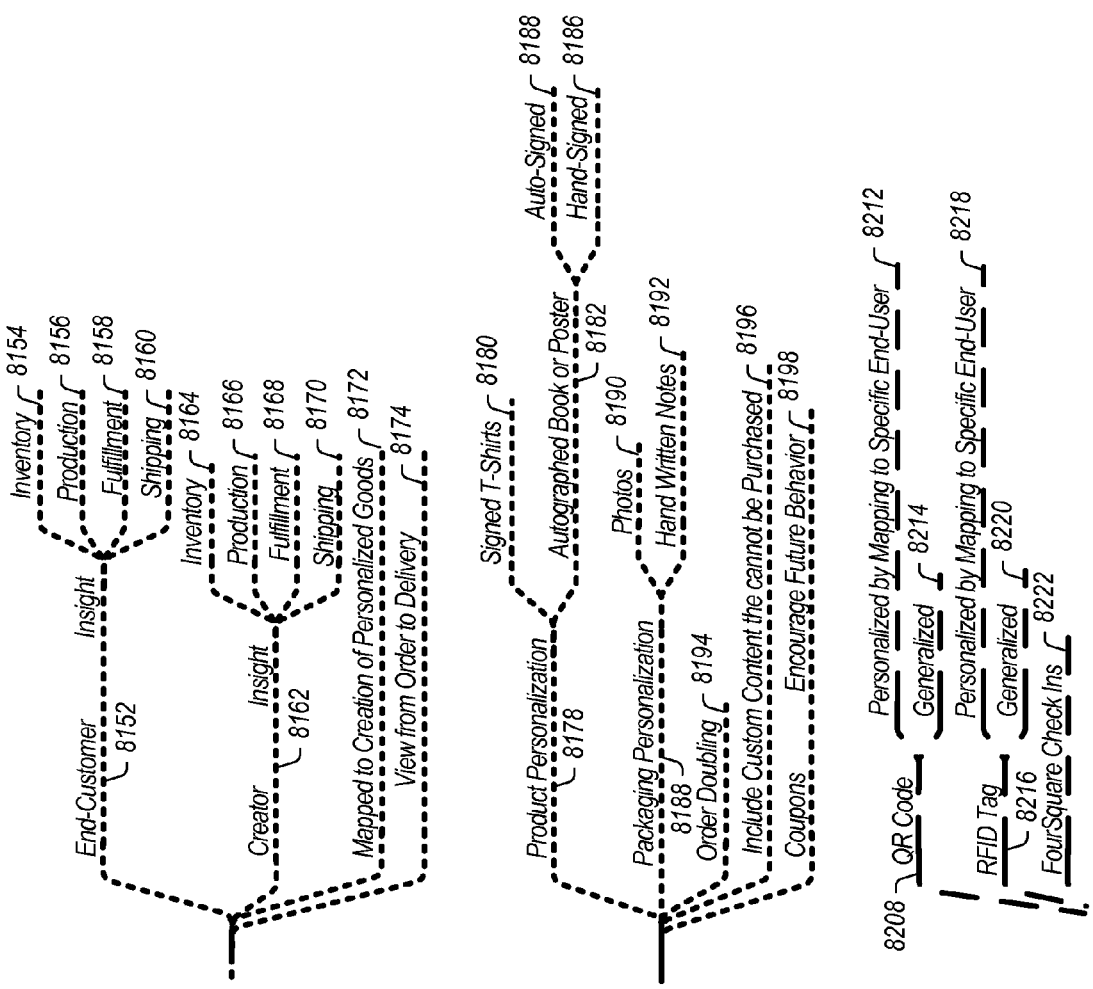
Figure 8J:
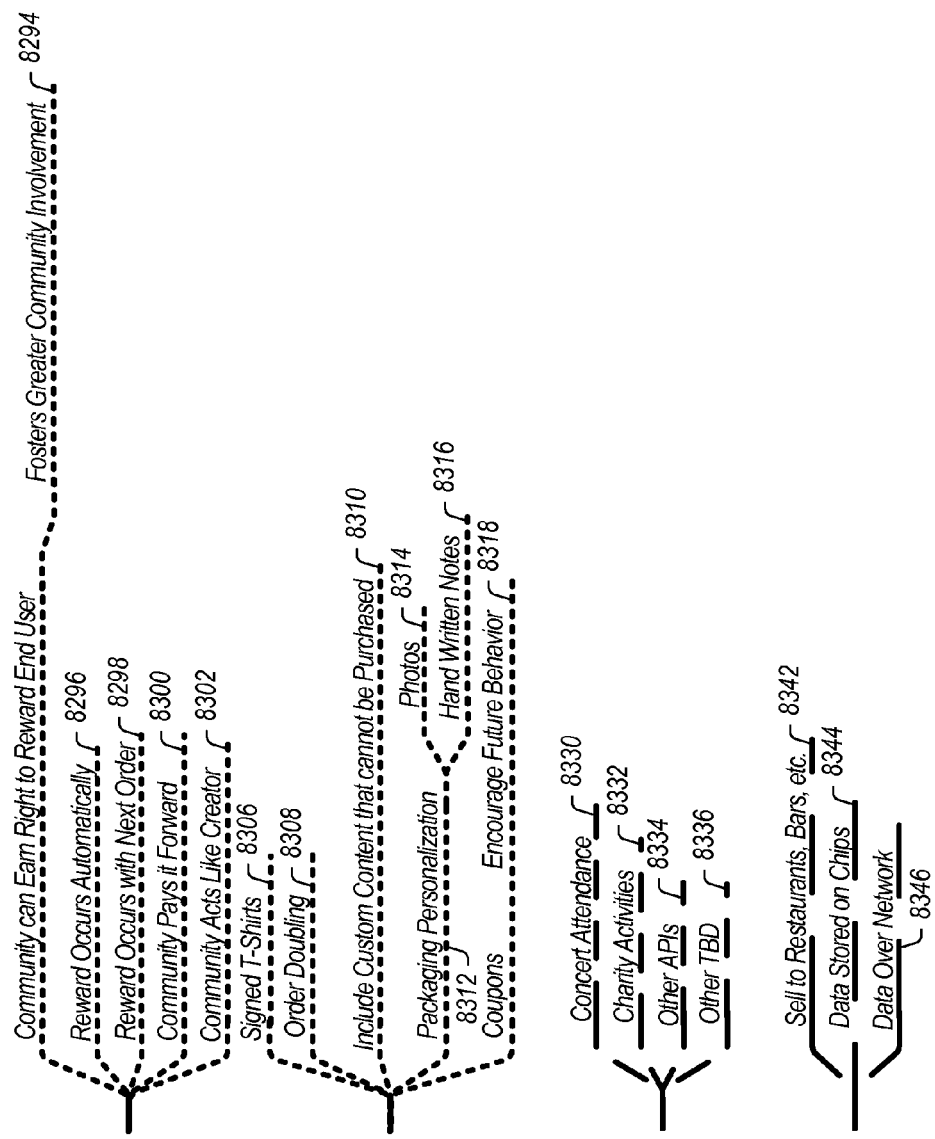

FIG. 7 is a flowchart of a process for rewarding and reinforcing desirable consumer behaviors, according to some embodiments. Receipt of the order is observed (block 710). A decision is made as to whether to modify the order based on surprise incentive rules, which may include alerting the merchant to provide manual intervention (block 712). The order is released with inclusion of the incentivizing reward or without the reward at the expiration of a time threshold (block 714).

FIGS. 8A-8J are a feature relationship diagram for rewarding and reinforcing desirable consumer behaviors, according to some embodiments. A customer behavior rewards engine 8086 can be implemented as part of a reward processing management module (e.g., rewards processing management module 223 of FIG. 2, including by implementing the functions described herein as portions of the various modules included in rewards processing management module 223). In some embodiments, a fulfillment entity implementing customer behavior rewards engine 8086 receives over an electronic interface from a merchant website associated with a third-party online user community an order from a member of the user community for an item from the merchant website. During order processing, a set of rules for rewarding members of the third-party online user community based on the past behaviors of one or more members of the user community is evaluated. Responsive to a condition fulfilling one of the rules, the member order is modified to provide an incentivizing reward to the member of the online user community. Some embodiments of focus on rewards during order processing 8088 provided by generating fulfillment instructions (e.g., fulfillment instructions 273 of FIG. 2) based on orders (e.g., from orders 253 of FIG. 2).

Some embodiments support rewards that are special and cannot be ordered 8032. Some embodiments provide support for transactions that are business to business or business to consumer 8002, for example to support fulfillment clients who want to reward their end consumers 8004. Some embodiments support several varieties of rule types 8010, such as surprise (infrequent and unexpected) rewards 8006 to reinforce behavior. Some embodiments support rule types on a frequent flyer miles model 8008 with known rule. Some embodiments support rules designed to maximize community member involvement 8012 (and therefore profit) by reinforcing desired behavior 8014. Some embodiments support rules to convey status within the community 8022, such as for most votes 8016, most effort 8018, or most funding raised 8020. Some embodiments support rules that act as a virtual t-shirt cannon 8024. Some embodiments support gambling-style reinforcement 8026 and dolphin and animal training-style reinforcement 8028.

Some embodiments support enhancing end-customer experience 8044, such as the end customer experience of a community 8036, a service 8034, a digital product (either made-to-order 8038 or pre-existing 8040) or a physical product 8050 (either made-to-order, such as a print-on-demand diploma 8046 or pre-existing 8048).

Some embodiments support rewards delivered by creators through differentiated fulfillment 8052 and rewards delivered 'in the field' by creators 8054. Some embodiments support rewards to deliver a message to the end consumer 8066, to tell the end consumer "we know you" 8056 or "we see you" 8058, or "we appreciate you" 8060 "you're one of us" 8062. Some embodiments support making methods invisible to the end customer 8064.

Some embodiments support co-creators 8076 working together 8068, as described above and inter-creator networks 8070 and create network effects 8074 between creators and communities 8074. Communities can post photos of members wearing merchandise 8078 such as t-shirts and a visible reward system can be displayed 8082, both of which can provide a feedback loop 8084.

In some embodiments, a reward occurs within fulfillment premises 8090. In some embodiments, creators, as discussed herein, make rewards by over-riding (e.g., re-mixing) orders 8096, which can be performed manually 8092 or by a creator using his tacit knowledge 8097, which can include knowledge of the customer 8098 (e.g., is the customer an active blogger 8100 or a celebrity customer 8102). Tacit knowledge 8097 can also include knowledge of product 8104, or by a rule setting an alert 8106, "e.g., next order with x characteristic, I want to be informed." Tacit knowledge 8097 can also include knowledge of a recurring customer.

Rewards during order processing 8088 can also result from rules to isolate orders for review by creators 8108. Such a rule to isolate orders for review by creators 8108 can include specified time window for action 8112, such that, in the event of inaction with respect to modifying the order, the order goes out without delay. Such a rule to isolate orders for review by creators 8108 be triggered by rule triggers such as dollar amounts 8118 of the current purchase or previous purchases, tenure 8120 of the user in the community, a number of orders 8122, activity outside of the community 8124, or random selection 8126.

In some embodiments, rewards during order processing 8088 can be distributed as a result of community votes for rewards 8126. In some embodiments, the community can earn the right to reward an end user 8130 to foster greater community involvement 8132. In some embodiments, rewards occur automatically 8134. In some embodiments, a reward is queued to occur with a next order 8136. In some embodiments, a community "pays it forward" by 8138 by paying for a reward for a user.

In some embodiments, a community performs functions normally performed like a creator of an item (as described above with respect to FIG. 7) 8140, for example with print-on-demand signatures from the community 8142, examples of which include rendering signatures on a yearbook 8144, a poster 8146, or a bumper sticker with names and signatures from the community, that, for example, acts as a 'signed cast' 8148.

Some embodiments provide for order transparency 8148, by for example providing an end customer 8152 with insight into inventor 8154, production 8156, fulfillment 8158 or shipping 8160. Similarly, some embodiments provide for order transparency 8148, by for example providing a creator 8162 with insight into inventor 8164, production 8166, fulfillment 8168 or shipping 8170. In some embodiments, order transparency involves the creation of personalized goods 8172, including using the methods discussed above with respect to FIGS. 2A and 7. In some embodiments, views of order status are available from order placement to delivery 8174.

Some embodiments support embedding of tokens in selected orders 8174. Example reward embodiments 8176 include product personalization 8178, such as signed t-shirts 8180, or an autographed book or poster 8182, any of which can be hand-signed 8186 or auto-signed 8188. Example reward embodiments 8176 further include personalization of packaging 8188, such as photographs 8190 or hand-written notes 8192. Example reward embodiments 8176 further include order doubling 8194 and can include custom content that is not available for purchase 8196, as well as coupons to encourage future behavior 8198.

Some embodiments support rewards rendered after fulfillment 8200. Some embodiments support rewards delivered "in the wild" 8202, i.e., involving services rendered outside the premises of a fulfillment operation. In some embodiments, rewards are supported through embedded tokens 8204, which, in some embodiments, includes an identifying token that is associated with an order. Token technology 8206 includes, in some embodiments, QR codes 8208 for providing a personalized mapping to a specific end user 8212 or QR codes 8208 for providing a generalized mapping 8214. Token technology 8206 includes, in some embodiments, RFID tags 8216 for providing a personalized mapping to a specific end user 8218 or RFID tags 8216 for providing a generalized mapping 8220. In some embodiments, foursquare check-ins 8222 provide the token function.

Some embodiments support rewards through smartphone tokens 8226, such as a creator app with limited-time tokens or near-field communication tokens 8228, other token technology will vary between embodiments without deviating from the scope of the present disclosure 8230, and token technology may be applied at the time of the order 8232.

In some embodiments, a database of tokens and mappings 8234 is provided (e.g., as part of database 166 of FIG. 1B). Such a database can include a set of initial mappings of users to products 8236 as well as data collected from the field 8238, such as concert attendance 8240 or charity activities 8242, which might reflect the interaction of a token with a sensor on the floor or in a door 8244 of a facility hosting an event.

Some embodiments support a variety token platforms 8246, which are finished goods that can support the tokens. For example, tokens can be applied to finished goods 8248 or applied to print-on-demand or made-to-order goods 8250. Use of tokens can support anti-counterfeiting measures 8252. Examples of sample platforms include t-shirts 8256, dog tags 8258, wrist bands 8260, coffee mugs 8262, and runners' racing stripes for shoes 8264.

Example embodiments 8266 include t-shirts 8268, with fundraising and donation tracked to a seller 8270, or with the t-shirt 8268 as a ticket due to an embedded RFID, unique QR code, or both 8722, which can serve as VIP authentication 8274 or a back stage pass 8276. In some embodiments, t-shirts 8268 can be used for partnerships, such as when a sponsor agrees that "if 100 people show up to the event, then the sponsor will do x," with attendance tracked using t-shirts 8268 with scans of an embedded RFID, unique QR code, or both 8722. In some embodiments, creators "in the field" can scan and reward end-customers without intervention by the fulfillment center 8280. Some embodiments support an augmented reality app that changes t-shirt artwork 8282, either in a poster 8284 or a t-shirt 8288, with different artwork based upon the RFID chip 8286.

In some embodiments, rewards after fulfillment 8200 can be distributed as a result of community votes for rewards 8290. In some embodiments, the community can earn the right to reward an end user to foster greater community involvement 8294. In some embodiments, rewards occur automatically 8296. In some embodiments, a reward is queued to occur with a next order 8298. In some embodiments, a community "pays it forward" by 8300 by paying for a reward for a user.

In some embodiments, a community performs functions normally performed like a creator of an item (as described above with respect to FIG. 7) 8302.

Example reward embodiments 8304 include product personalization, such as signed t-shirts 8306. Example reward embodiments 8304 further include order doubling 8308 and can include custom content that is not available for purchase 8310. Example reward embodiments 8304 further include personalization of packaging 8312, such as photographs 8314 or hand-written notes 8316, as well as coupons to encourage future behavior 8318.

In some embodiments, a database for creators 8318 is provided (e.g., as part of database 166 of FIG. 1B). Such a database can include a database of tokens and mappings 8320, including a set of initial mappings of users to products 8322 as well as data collected from the field 8326, such as concert attendance 8330 or charity activities 8332 and may support third-party APIs 8334 and other features to be determined 8336, which might reflect the interaction of a token with a sensor on the floor or in a door of a facility hosting an event. Such a database may include a database API for creator communities to read database content 8336 and may include devices for mapping tokens to activity 8338, which may be useful for sale to restaurants and bars 8342 or may use data stored on chips 8344 or provided over a network 8346.

Example System

Figure 9:
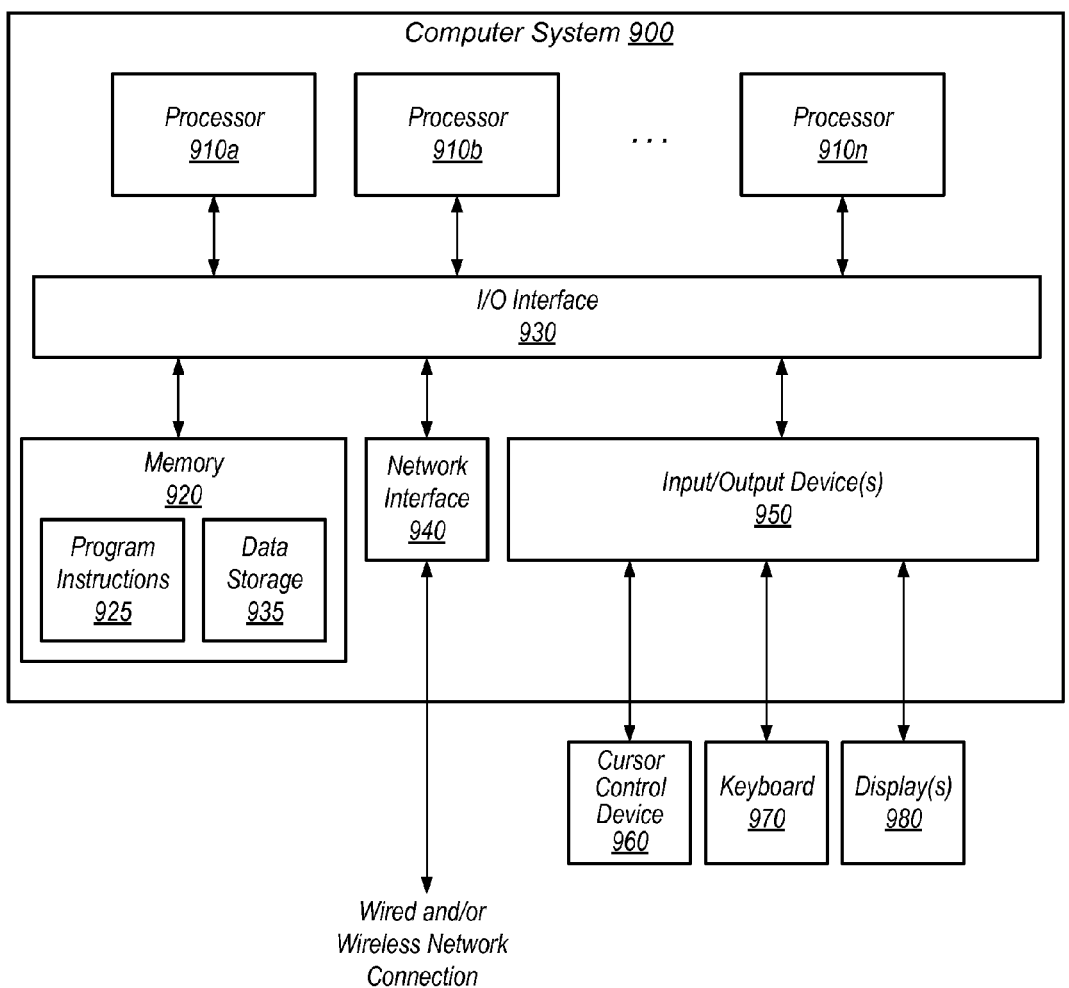
FIG. 9 illustrates an example computer system that may be used in embodiments.

Embodiments of a module for rewarding and reinforcing desirable consumer behaviors and/or of the production resources management techniques as described herein may be executed on one or more computer systems, which may interact with various other devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 920 may be configured to store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a module for rewarding and reinforcing desirable consumer behaviors are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement embodiments of a module for rewarding and reinforcing desirable consumer behaviors as described herein, and data storage 935, comprising various data accessible by program instructions 925. In one embodiment, program instructions 925 may include software elements of embodiments of a module for rewarding and reinforcing desirable consumer behaviors as illustrated in the above Figures. Data storage 935 may include data that may be used in embodiments. In other embodiments, other or different software elements and data may be included.

Those skilled in the art will appreciate that computer system 900 is merely illustrative and is not intended to limit the scope of a module for rewarding and reinforcing desirable consumer behaviors as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method of providing customization rules of an item by a fulfillment entity, the method comprising:
performing by one or more servers of the fulfillment entity:
receiving
an electronic communication from a merchant website associated with a third-party online user community, and
an order from a member of the third-party online user community for an item from the merchant website, wherein
the item is associated with the third-party online user community;
responsive to receiving the order, transmitting an electronic notification to a community leader of the third-party online user community,
wherein the notification provides an identity of the member and a link to an online user interface allowing the community leader to input the customization rules for a physical customization of the item including a modification of the item corresponding to the identity of the member and the members activities associated with the third-party online user community;
receiving, over the online user interface the customization rules for the item from the community leader;
responsive to receiving the customization rules, modifying the order by performing the physical customization of the item based on the customization rules; and
packaging the item for shipping, wherein
the physical customization is not disclosed to the member of the third-party online user community until the user receives a package comprising the item.

2. The method of claim 1, further comprising:
holding an order for a discretionary manual assessment by the fulfillment entity of an appropriate incentivizing reward;
applying the incentivizing reward based on discretionary manual assessment; and
releasing the order with inclusion of the incentivizing reward.

3. The method of claim 1, wherein
the modifying is performed after completion of the order by the member of the third-party online user community but before delivery of the order; and
the method further comprises evaluating the set of rules for rewarding the members of the third-party online user community based on the behaviors of one or more members of the third-party online user community, wherein the evaluating further comprises:
evaluating input from members of the third-party online user community with respect to the member of the third-party online user community identified as recipient of the order for the item from the merchant website; and
the modifying the order further comprises:
applying the incentivizing reward based on a set of community input rules correlating a set of incentivizing rewards to the input from members of the third-party online user community, and
releasing the order with inclusion of the incentivizing reward.

4. The method of claim 1, further comprising:
before order processing, determining the set of rules for rewarding members of the user community based at least in part on an analysis of electronically monitored transactions of one or more members of the third-party online user community;
wherein
the transactions comprise economic transactions comprising previous orders;
the transactions comprise interactions between different members of the third-party online user community;
the set of rules comprises a set of rules for rewarding members of the third-party online user community based on individual behaviors of the member; and
each rule of the set of rules describes an individual behavior of a particular member of the user community and a resulting reward activity for performance by the fulfillment entity upon receipt of an indication of performance of the individual behavior by the particular member of the user community.

5. The method of claim 1, further comprising:
the fulfillment entity electronically monitoring the individual attributes of members of the third-party online user community for a possession by the member of the third-party online user community of an individual attribute described in a selected rule; and
responsive to possession by the member of the third-party online user community of the individual attribute described in the selected rule, the fulfillment entity performing a resulting incentivizing reward activity described in the selected rule.

6. The method of claim 1, further comprising:
the fulfillment entity electronically monitoring the attributes of members of the third-party online user community for a performance by one or more members member of the third-party online user community of behavior described in a selected rule; and
responsive to performance by the one or more members of the third-party online user community of the behavior described in the selected rule, the fulfillment entity performing a resulting incentivizing reward activity described in the selected rule.

7. A system for providing customization rules of an item by a fulfillment entity, the system comprising:
one or more servers of a fulfillment entity including at least a processor; and
program instructions computer-executable to cause the at least one processor to perform by operation of one or more servers of the fulfillment entity:
receiving
an electronic communication from a merchant website associated with a third-party online user community, and
an order from a member of the third-party online user community for an item from the merchant website, wherein the item is associated with the third-party online user community;
responsive to receiving the order, transmitting an electronic notification to a community leader of the third-party online user community,
wherein the notification provides an identity of the member and a link to an online user interface allowing the community leader to input the customization rules for a physical customization of the item including a modification of the item corresponding to the identity of the member and the members activities associated with the third-party online user community;
receiving, over the online user interface the customization rules for the item from the community leader;
responsive to receiving the customization rules, modifying the order by performing the physical customization of the item based on the customization rules; and
packaging the item for shipping, wherein
the physical customization is not disclosed to the member of the third-party online user community until the user receives a package comprising the item.

8. The system of claim 7, wherein the program instructions further comprise:
program instructions computer-executable to cause the processor to hold an order for a discretionary manual assessment by a fulfillment entity of an appropriate incentivizing reward;
program instructions computer-executable to cause the processor to apply the incentivizing reward based on discretionary manual assessment; and
program instructions computer-executable to cause the processor to release the order with inclusion of the incentivizing reward.

9. The system of claim 7, further comprising:
program instructions computer-executable to cause the processor to evaluate input from members of the third-party online user community with respect to the member of the third-party online user community identified as recipient of the order for the item from the merchant website;
program instructions computer-executable to cause the processor to apply the incentivizing reward based on a set of community input rules correlating a set of incentivizing rewards to the input from members of the third-party online user community; and
program instructions computer-executable to cause the processor to release the order with inclusion of the incentivizing reward.

10. The system of claim 7, wherein:
the set of rules comprises a set of rules for rewarding members of the third-party online user community based on individual behaviors of the member; and
each rule of the set of rules describes an individual behavior of a particular member of the user community and a resulting reward activity for performance by the fulfillment entity upon receipt of an indication of performance of the individual behavior by the particular member of the third-party online user community.

11. The system of claim 7, further comprising:
program instructions computer-executable to cause the processor to facilitate the fulfillment entity electronically monitoring the individual attributes of members of the third-party online user community for a possession by the member of the third-party online user community of an individual attribute described in a selected rule; and
program instructions computer-executable to cause the processor to, responsive to possession by the member of the user community of the individual attribute described in the selected rule, facilitate the fulfillment entity performing a resulting incentivizing reward activity described in the selected rule.

12. The system of claim 7, further comprising
program instructions computer-executable to cause the processor to facilitate the fulfillment entity electronically monitoring the attributes of members of the third-party online user community for a performance by one or more members member of the third-party online user community of behavior described in a selected rule; and
program instructions computer-executable to cause the processor to, responsive to performance by the one or more members of the third-party online user community of the behavior described in the selected rule, facilitate the fulfillment entity performing a resulting incentivizing reward activity described in the selected rule.

13. The system of claim 7, further comprising:
program instructions computer-executable to cause the processor to facilitate the fulfillment entity electronically monitoring the individual attributes of members of the third-party online user community for a performance by a member of the third-party online user community of an individual behavior described in a selected rule; and
program instructions computer-executable to cause the processor to, responsive to performance by a member of the third-party online user community of an individual behavior described in the selected rule, facilitate the fulfillment entity performing a resulting incentivizing reward activity described in the selected rule.

14. A non-transitory computer-readable storage medium storing program instructions, wherein the program instructions are computer-executable to implement:
receiving
an electronic communication from a merchant website associated with a third-party online user community, and
an order from a member of the third-party online user community for an item from the merchant website, wherein
the item is associated with the third-party online user community;
responsive to receiving the order, transmitting an electronic notification to a community leader of the third-party online user community,
wherein the notification provides an identity of the member and a link to an online user interface allowing the community leader to input the customization rules for a physical customization of the item including a modification of the item corresponding to the identity of the member and the members activities associated with the third-party online user community;
receiving, over the online user interface the customization rules for the item from the community leader;
responsive to receiving the customization rules, modifying the order by performing the physical customization of the item based on the customization rules; and
packaging the item for shipping, wherein
the physical customization is not disclosed to the member of the third-party online user community until the user receives a package comprising the item.

15. The non-transitory computer-readable storage medium of claim 14, wherein
the program instructions computer-executable to implement modifying the order further comprise:
program instructions computer-executable to implement holding an order for a discretionary manual assessment by the fulfillment entity of an appropriate incentivizing reward;
program instructions computer-executable to implement applying the incentivizing reward based on discretionary manual assessment; and
program instructions computer-executable to implement releasing the order with inclusion of the incentivizing reward.

16. The non-transitory computer-readable storage medium of claim 14, further comprising
program instructions computer-executable to implement evaluating input from members of the third-party online user community with respect to the member of the third-party online user community identified as recipient of the order for the item from the merchant website;
program instructions computer-executable to implement applying the incentivizing reward based on a set of community input rules correlating a set of incentivizing rewards to the input from members of the third-party online user community; and
program instructions computer-executable to implement releasing the order with inclusion of the incentivizing reward.

17. The non-transitory computer-readable storage medium of claim 14, wherein
the set of rules comprises a set of rules for rewarding members of the third-party online user community based on individual behaviors of the member; and
each rule of the set of rules describes an individual behavior of a member of the third-party online user community and a resulting reward activity for performance by the fulfillment entity upon receipt of an indication of performance of the individual behavior by the member of the user community.

18. The non-transitory computer-readable storage medium of claim 14, further comprising:
program instructions computer-executable to implement the fulfillment entity electronically monitoring the individual attributes of members of the user community for a possession by the member of the third-party online user community of an individual attribute described in a selected rule; and
program instructions computer-executable to implement, responsive to possession by the member of the third-party online user community of the individual attribute described in the selected rule, the fulfillment entity performing a resulting incentivizing reward activity described in the selected rule.

19. The non-transitory computer-readable storage medium of claim 14, further comprising:
program instructions computer-executable to implement the fulfillment entity electronically monitoring the attributes of members of the third-party online user community for a performance by one or more members member of the third-party online user community of behavior described in a selected rule; and
program instructions computer-executable to implement responsive to performance by the one or more members of the third-party online user community of the behavior described in the selected rule, the fulfillment entity performing a resulting incentivizing reward activity described in the selected rule.

20. The method of claim 1, wherein the identity of the member includes near-field identification information related to the member.

\* \* \* \* \*